US006657711B1

(12) United States Patent
Kitagawa et al.

(10) Patent No.: US 6,657,711 B1
(45) Date of Patent: Dec. 2, 2003

(54) VEHICLE WHEEL ALIGNMENT MEASURING APPARATUS

(75) Inventors: Hideo Kitagawa, Tokyo (JP); Hiroshi Takagi, Kamakura (JP)

(73) Assignees: Anzen Motor Car Co., Ltd., Tokyo (JP); Mitsubishi Precision Co., Ltd., Tokyo (JP)

( * ) Notice: Subject to any disclaimer, the term of this patent is extended or adjusted under 35 U.S.C. 154(b) by 544 days.

(21) Appl. No.: 09/603,593

(22) Filed: Jun. 26, 2000

(30) Foreign Application Priority Data

Jun. 25, 1999 (JP) .......................................... 11-180425

(51) Int. Cl.[7] .......................... G01B 11/26; G01B 5/255; G01C 1/00; G01C 3/08; G05B 13/00
(52) U.S. Cl. ................. 356/155; 356/4.03; 356/139.09; 356/141.1; 356/152.1; 33/203.12; 33/203.18; 33/203.19; 33/288; 358/95; 700/279; 702/113; 280/86.758
(58) Field of Search ............................... 356/155, 141.1, 356/139.09, 4.03, 152.1; 33/288, 203.18, 203.19, 203.2, 203.12; 348/95; 700/279; 702/113; 701/36; 280/86.758

(56) References Cited

U.S. PATENT DOCUMENTS 4,249,824 A * 2/1981 Wiederrich et al. ......... 356/155
4,745,469 A    5/1988 Waldecker et al. ........... 348/94
4,899,218 A * 2/1990 Waldecker et al. ........... 348/94
5,054,918 A * 10/1991 Downing et al. ....... 356/139.09
5,198,919 A * 3/1993 Reeder ....................... 359/216
5,532,816 A * 7/1996 Spann et al. ........... 356/139.09
5,870,315 A * 2/1999 January ....................... 700/279
5,978,077 A * 11/1999 Koerner et al. ........ 356/139.09
6,400,451 B1 * 6/2002 Fukuda et al. ......... 356/139.09
6,414,304 B1 * 7/2002 Boess et al. ............. 250/231.13

FOREIGN PATENT DOCUMENTS

JP            7-81853         10/1988

* cited by examiner

*Primary Examiner*—Russell Adams
*Assistant Examiner*—Magda Cruz
(74) *Attorney, Agent, or Firm*—Paul & Paul

(57) ABSTRACT

An apparatus for measuring the dynamic characteristics of the vehicle wheel alignment in non-contact fashion with high accuracy is disclosed. A laser light source (4) emits a laser beam of a predetermined geometric pattern toward the wheel side surface. A laser beam control device (6) controls the width of the laser beam in such a manner as to be radiated only in a predetermined range of the wheel side surface. Two laser light sources (120), (121) emit non-parallel laser beams. A photodetecting device (122) receives the two laser beams and converts them to two corresponding image data. A processing unit calculates the distance between the two images based on the two image data and calculates the wheel alignment based on the same distance.

28 Claims, 20 Drawing Sheets

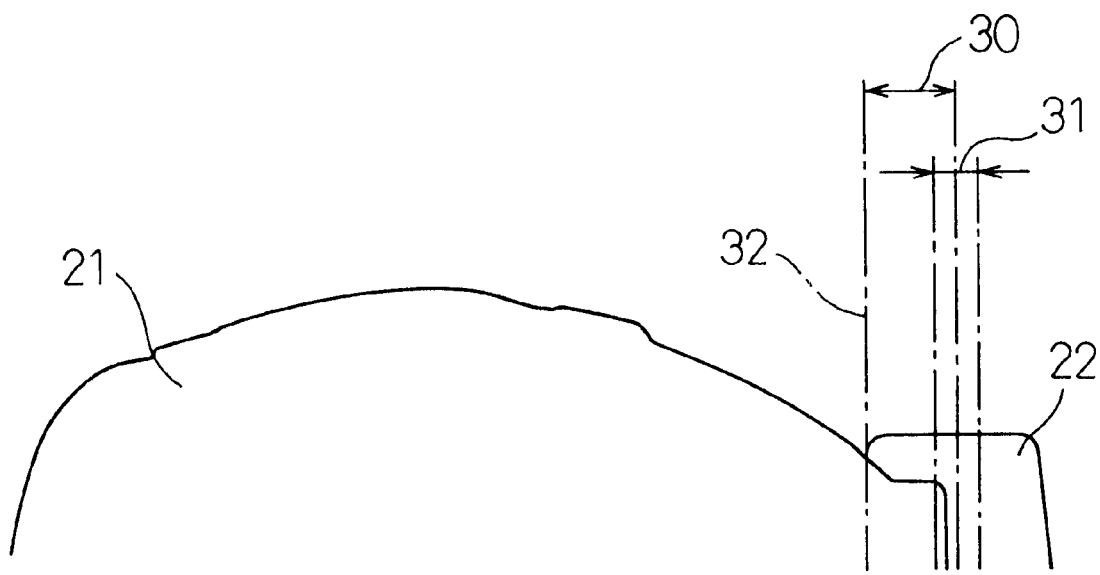

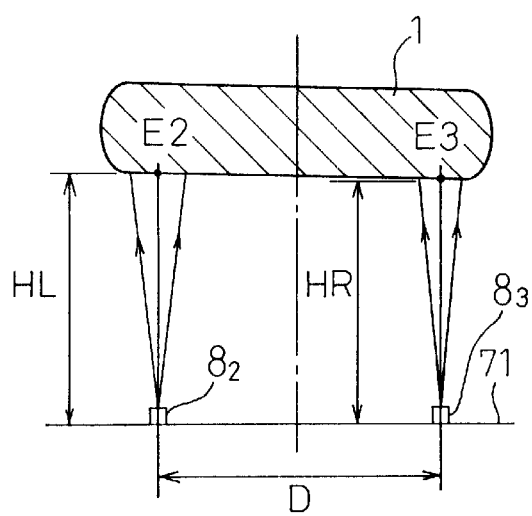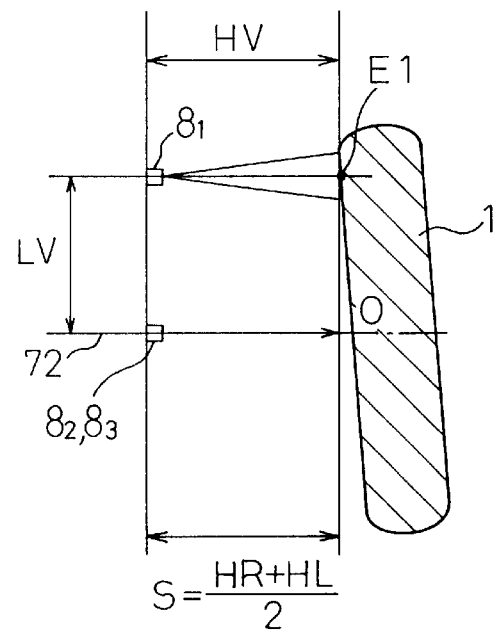

VEHICLE WHEEL ALIGNMENT MEASURING APPARATUS

BACKGROUND OF THE INVENTION

1. Field of the Invention

The present invention relates to an alignment measuring apparatus for an automotive vehicle wheel in which the inclination angles, including the toe-in angle and the camber, of a wheel mounted through the suspension of a vehicle are measured using a non-contact measuring technique by optical length measurement with the wheel rotating and stationary.

The inclination angles used for indicating the mounting position of the wheels of an automotive vehicle or the like include the inclination angle of the wheel or the tire surface with respect to the direction of progress of the vehicle (toe-in angle), the degree of inclination of the wheel or the tire surface with respect to the vertical plane (camber angle), and the caster. Accurate measurement and adjustment of the wheel alignment including all of these angles is an important factor for improving the driving characteristics.

In this specification, the "wheel" is defined to include the tire portion and the rim flange of the. wheel.

The toe-in angle is an angle indicating whether the tires are wider apart at the front or at the back as viewed from above the vehicle body and concerns both the front and rear wheels. If wheels are wider apart at the front, this is called toe-out, and if the wheels are wider apart at the rear, this is called toe-in.

The camber angle is an angle indicating whether the wheel is wider apart at the top or at the bottom as viewed from the direct front or rear of the vehicle, and represents the angle formed by the normal to the ground contact point of the tire and a straight line along the tire. When the tire is perpendicular to the ground, the camber is zero; when the tire is inclined inward, the camber is negative; and the tire inclined outward is positive in camber. The camber angle is measured for the purpose of facilitating the steering operation, reducing the vertical load and preventing the wheel from becoming wider apart at the bottom.

The caster, which is required for maintaining the straight-line stability, is defined as the angle between the vertical at the wheel center and the inclination of the king pin shaft as viewed directly sideways from the wheel. A positive caster is involved if the king pin shaft is inclined rearward, a negative caster is involved if the king pin shaft is inclined forward, and a zero caster is involved if the king pin shaft is in a vertical position.

2. Description of the Related Art

As a conventional alignment measuring apparatus, a direct contact measuring apparatus for measuring the angle by bringing the measuring unit into direct contact with the tire disclosed in Japanese Examined Patent Publication (KOKOKU) No. 62-121128 is known.

In recent years, as disclosed in Japanese Unexamined Patent Publication (KOKAI) No. 7-081853, a non-contact wheel alignment measuring apparatus, using optical length measurement, free of mechanical wear or degeneration which imposes no stress on the object of measurement has been realized in place of the wheel alignment measuring apparatus of contact type. The newly-developed apparatus uses a light beam based on trigonometry.

A method of measuring the wheel alignment statically by optical length measurement without using the light beam for trigonometry is the method disclosed in Japanese Examined Patent Publication (KOKOKU) No. 6-025661. In this method, a point corresponding to a reflected image of a slit light is determined by one camera, and the position of the corresponding point is calculated by another camera using the geometric restraints of the slit light. For this reason, a vast amount of calculations is required between the image data of the two cameras. Therefore, the application of this method to the dynamic in-line wheel alignment measurement requiring the high-speed determination of the inclination angle is very difficult, and practically limited to static wheel alignment measurement. In the measurement and adjustment of the wheel alignment of the vehicle with the wheels mounted, the wobbling of the wheel rim is a major cause of an error. Currently, therefore, the dynamic wheel alignment measurement is essential in which the wobbling of the wheels or the rim is corrected. With the method disclosed in Japanese Examined Patent Publication (KOKOKU) No. 6-025661, however, accurate dynamic wheel alignment measurement is difficult.

Among the apparatuses for non-contact measurement of the wheel alignment of a vehicle while rotating the wheels of the vehicle, the techniques disclosed in Japanese Examined Patent Publication (KOKOKU) No. 6-011420 and Japanese Unexamined Patent Publication (KOKAI) No. 9-329433 concern a method using a spot laser displacement meter based on triangulation. In the method disclosed in KOKOKU No. 6-011420, however, the distance measuring sensor is the spot laser displacement meter, and therefore, as the conditions. for accurate measurement, the tire side profile is required to be exactly symmetrically homogeneous diametrically about the wheel center around the whole wheel. Actually, however, the tire side section has a complicated shape, has an unevenness due to letters or the like and it is not symmetrically homogeneous. Further, unless a pair of distance measuring sensors and the swivel axes thereof are arranged equidistantly coaxially with the center of the wheel involved, the radiation point of the laser spot is deviated and constitutes a cause of a serious error. Taking into account the behavior of the vehicle while the wheels are rotating at the time of measuring the manufacturing variations of the wheel base of the vehicle, however, accurate positioning is very difficult and a high-accuracy wheel alignment measurement is impossible. In the method disclosed in KOKAI No. 9-329433, on the other hand, the distance measuring sensor is mechanically scanned, and therefore, the scanning mechanism is worn or unavoidably deteriorated on the one hand, and a considerable time is required for determining the number of measuring points required for correcting the wheel frame. The higher the measuring speed, the earlier the wear or deterioration occurs, leading to the disadvantages of a reduced accuracy and a higher maintenance cost.

Among the apparatuses for measuring the wheel alignment of the vehicle in non-contact fashion while rotating the wheels, the technique disclosed in KOKOKU No. 7-081853 is a method using a two-dimensional laser displacement meter based on triangulation. This method, in spite of its advantage of compensating for the disadvantage of the spot laser method described above, has the disadvantage that the laser projection width and pattern are fixed so that the portions requiring no measurement are also exposed to the light, and irregular reflection occurs for some objects of measurement due to the difference in the edge shape or the material. In these methods using the two-dimensional area photo detector, a screen (or field) is instantaneously exposed to light, and therefore, in the worst case, the irregular reflection may have an adverse effect even on the portions which would have otherwise been normally measured. Such adverse effect is very difficult to identify and remove, thus often resulting in a considerable measurement error or making the measurement impossible.

In the situation requiring a rotational angle of the wheel of at least 10° when measuring the steering angle or the caster by turning the steering wheel using the conventional method in which the angle detection mechanism is brought into contact with the tire side surface, it is difficult for the detection mechanism to track and detect the tire side uniformly following the wheel center. This causes a measurement error of the toe and the camber, thereby making it impossible to measure the steering angle and the caster with high accuracy. Even in the conventional non-contact measuring apparatus, the detection point defining the tire side is a specific spot on the tire side wall or a point nearest to the tire side wall from the detector, so that the steering angle cannot be measured or the measurement error of the toe and camber is so excessive that high-accuracy caster measurement is impossible.

In all the methods of the prior art, the laser projection width and the pattern are fixed. Therefore, in the case where the vehicle tire and the peripheral parts thereof which have a complicated shape is the object of measurement, light is radiated also on the portions requiring no measurement, and irregular reflection occurs depending on the edge geometry, gloss or material. As a-result, in the worst case, even the portions which could otherwise have been normally measured are adversely affected, often causing a considerable measurement error or even making the measurement impossible. To cope with this problem, the conventional apparatus sometimes comprises software means for processing only the required portion of the brightness information read by the light-receiving side or removing faulty points by arithmetic operation. This cannot provide means for suppressing the cause of the disturbances in the projection stage which is a source of the irregular reflection. In the active sensor for applying light to these objects of measurement, the performance and operability can be further improved by appropriately designing the projection method.

In the method using the spot laser displacement meter, on the other hand, accurate positioning of the sensor is difficult with respect to the wheel rotational shaft center, and therefore the sensor is mechanically scanned. It is difficult, however, to maintain an accurate sensor position for a long time due to the mechanical wear and tear. The situation may become more difficult if the projection width and the pattern is to be made variable, as a more complicated mechanism is required.

The optical cutting method which uses trigonometry requires an accurate arrangement of the laser projection angle and position with respect to the tire, the direction of camera detection and position, thereby leading to the shortcoming of complicating the mounting jigs while at the same time requiring labor-consuming installation, adjustment and calibration.

Thus, an alignment measuring apparatus, which can handle a variety of objects in-line and measure and adjust the dynamic wheel alignment with high accuracy free of maintenance for a long period of time, is in demand.

SUMMARY OF THE INVENTION

The object of the present invention is to provide a simple, inexpensive vehicle wheel alignment measuring apparatus in which the radiation range for a great variety of wheels constituting objects of wheel alignment measurement can be dynamically changed at high speed and in versatile way at many points of the required portions alone and, at the time of projection, the radiation range is specified to be unaffected by disturbances such as irregular reflection, while at the same time reading the brightness information on the photodetection side in collaboration and synchronism with the limitation of the radiation range, so that only the target radiation range within the measurement area can be processed with high speed, thereby obviating the disadvantage of the prior art described above and making it possible to measure the dynamic characteristics of the wheel alignment with high accuracy.

In order to achieve the aforementioned object, according to a first aspect of the invention, there is provided a vehicle wheel alignment measuring apparatus for measuring, in non-contact fashion, the wheel alignment of a vehicle on rotating wheels, comprising laser light source means for radiating a laser beam having a section of a predetermined geometric pattern at least toward the side of a wheel, laser beam control means for controlling the laser beam in such a manner as to radiate the laser beam only within a predetermined range on the side surface of the wheel, a photodetecting device for receiving the laser beam reflected in a predetermined range on the side surface of the wheel under the control of the laser beam control means and converting the received laser beam into a corresponding image data, and processing means for calculating the wheel alignment by processing the image data.

In view of the fact that the laser beam from the laser light source means is radiated only in a predetermined range of the side surface of the wheel, disturbances such as irregular reflection can be suppressed in advance. Also, by processing only the required range within the visual field, the alignment can be measured at high speed with high accuracy as compared with the prior art.

A two-dimensional area photodetector is preferable as the photodetecting device.

Since the two-dimensional area photodetector is used, the intended range, i.e. the scanning range of the light source, even if dynamically changed as required within the preset range of the visual field, can be detected easily with a simple threshold-setting process, thereby permitting an alignment measurement at higher speed.

The one-dimensional line photodetector can also be used as the photodetecting device.

In the method using the one-dimensional line photodetector, the laser beam is received and processed sequentially by scanning the beam reflected from the geometric pattern in the one-dimensional direction, and therefore, even in case of a disturbance such as irregular reflection that may occur, the faulty data is localized at the particular time point, and the data that have been and will be normally retrieved are not affected. Also, the one-dimensional line photodetector is advantageous for obtaining a high resolution and can simplify the processing operation, and therefore can make possible the alignment measurement with lower cost and higher accuracy than the method using the two-dimensional area photodetector.

In the case where the one-dimensional line photodetector is used, however, the information indicating the horizontal-position along the scanning direction of the laser beam source is required from light source control means or another position detecting means.

According to a second aspect of the invention, there is provided a vehicle wheel alignment measuring apparatus for measuring, in non-contact fashion, the wheel alignment of the vehicle on rotating wheels, comprising two laser light sources for radiating unparallel laser beams having a section of a predetermined geometric pattern at a finite predetermined angle toward at least different points on the side of the wheel, a photodetecting device for receiving the laser beams reflected from the side surface of the wheel irradiated with the laser beams emitted from the two laser light sources and converting the received laser beams into corresponding two image data, and processing means for calculating the distance between the two images based on the two image data and calculating the wheel alignment based on the calculated distance.

The two images formed on the side surface of the tire or the wheel by the laser beams from the two laser light sources are converted into image data by the photodetecting device, and then processed by the processing means, as described above. By measuring the change of the distance between the two images in accordance with the rotation of the tire, it is possible to measure the inclination angle of the wheel.

The distance between the two images on the tire or the wheel is not dependent on the distance between the laser beam light source and the photodetecting device, and neither the laser beam radiated on the tire or the wheel nor the reflected beam proceeding toward the photodetecting device is required to be exactly orthogonal to the surface of the tire or wheel. Thus, the installation and calibration of the laser light. source and the photodetecting device are substantially free of the effect of the mounting error or the aged deterioration, thereby improving the operability.

BRIEF DESCRIPTION OF THE DRAWINGS

FIG. 6 is a diagram showing a still further example of selecting a representative point in FIG. 1.

FIGS. 7A and 7B are diagrams for explaining the manner in which the toe-in angle and the camber of the wheel alignment characteristics are calculated based on the detection value obtained from the alignment measuring apparatus shown in FIG. 1.

DESCRIPTION OF THE PREFERRED EMBODIMENTS

Figure 1:
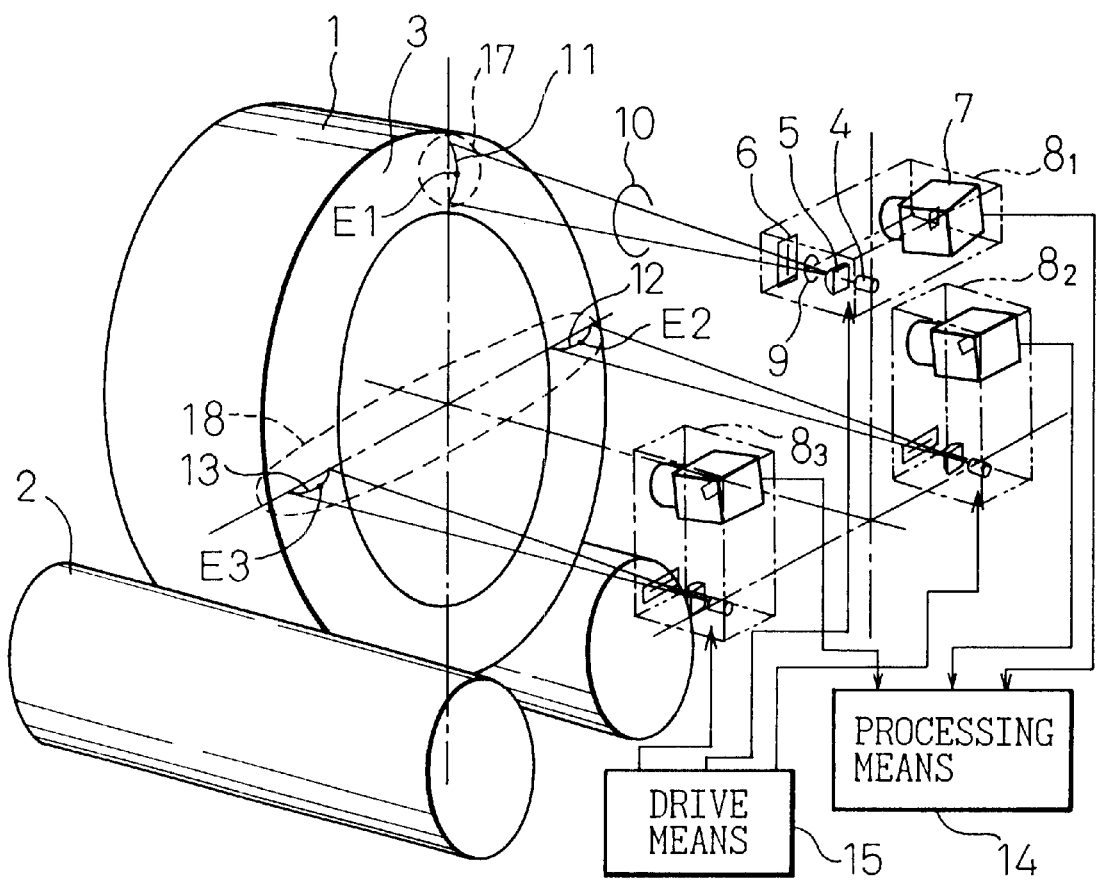
FIG. 1 is a perspective view schematically showing an alignment measuring apparatus according to a first embodiment of the present invention.

An embodiment of the invention will be explained in detail below with reference to the drawings. In all the drawings, the same reference numerals designate the same or corresponding component parts, respectively. The dimensions, material, shape or the relative positions of the component parts described in the embodiments, however, are only illustrative but not intended for limiting the scope of invention unless otherwise specified.

FIG. 1 is a perspective view showing a general configuration of a vehicle alignment measuring apparatus according to a first embodiment of the invention. In FIG. 1, reference numeral 1 designates a,wheel, numeral 2 a floating drive roller table, numeral 3 a side of the wheel, numeral 4 a laser light source, numeral 5 a barrel-shaped lens, numeral 6 an electro-optic effect device as a laser beam control means, and numeral 7 a photodetecting device. A detection unit $8_1$ includes the laser light source 4, the barrel-shaped lens 5, the electro-optic effect device 6 and the photodetecting device 7.

A laser beam having a section of a predetermined geometric pattern is emitted from an optical system including the laser beam source 4 and the barrel-shaped lens 5. The predetermined geometric pattern includes a cross, linear or a plurality of dots arranged linearly. The laser beam of a predetermined geometric pattern is emitted for purposes of radiating the laser beam only on the required places including the comparatively flat central portion of the tire side wall or the peripheral portion of the disk wheel rim, thereby preventing the irregular reflection of the laser beam which may otherwise be radiated on an uneven place such as the disk portion of the disk wheel, the ends of the tire side wall or the body fender portion. The optical system for radiating the laser beam having a section of a geometric pattern is commercially available.

The electro-optic effect device 6 reduces the laser beam 9 having a section of the predetermined geometric pattern spread by the barrel-shaped lens 5 and forms a linear laser beam 10. The laser beam is further reduced in this way for the purpose of further preventing the irregular reflection by radiating the laser beam only on the comparatively flat central portion of the tire side wall or the peripheral portion of the disk wheel rim but not on the uneven places such as the spokes of the aluminum wheel, the ends of the tire side wall or the body fender.

Two detectors $8_2$ and $8_3$ having a configuration similar to the detector $8_1$ are also provided. The outputs of the detectors $8_1$ to $8_3$ are connected to the processing means 14. Numeral 15 designates drive means for appropriately controlling the angle of the laser light source 4, the barrel-shaped lens 5 and the electro-optic effect device 6 to the wheel side surface 3. The drive means 15 also controls the angle of the optical system in the other detectors $8_2$ and $8_3$ to the wheel side surface 3.

In operation, the laser beam 10 emitted from the detector $8_1$ plots a linear pattern image-11 at the top 17 of the wheel side 3. The laser beams emitted from the detectors $8_2$ and $8_3$ plot the left and right pattern images 12 and 13, respectively, of the central portion 18 of the wheel side surface. The three pattern images 11 to 13 are detected by the photodetecting devices in the detectors $8_1$ to $8_3$, so that the representative points E1 to E3 thereof are determined by the processing means 14. The processing means calculates the toe-in angle and the camber angle by a well-known method based on the positions of the representative points E1 to E3.

The provision of the electro-optic effect device 6 makes it possible to radiate the laser beam only on the required places such as the comparatively flat central portion of the tire side wall and the peripheral portion of the disk wheel rim and positively prevents the irregular reflection of the laser beam which otherwise might be caused by the laser beam radiated on the uneven places such as the spokes of the aluminum wheel, the ends of the tire side surfaces or the body fender. Also, the inclination angle of the tire is measured only at the comparatively flat portion of the tire side wall, and therefore the alignment can be measured at high speed with high accuracy. Further, the unrequired reflected light is prevented from affecting the person measuring the-alignment, thereby reducing the discomfort of the measuring work.

FIGS. 2 to 6 are diagrams showing an example of selecting the representative points E1 to E3 in FIG. 1.

Figure 2:
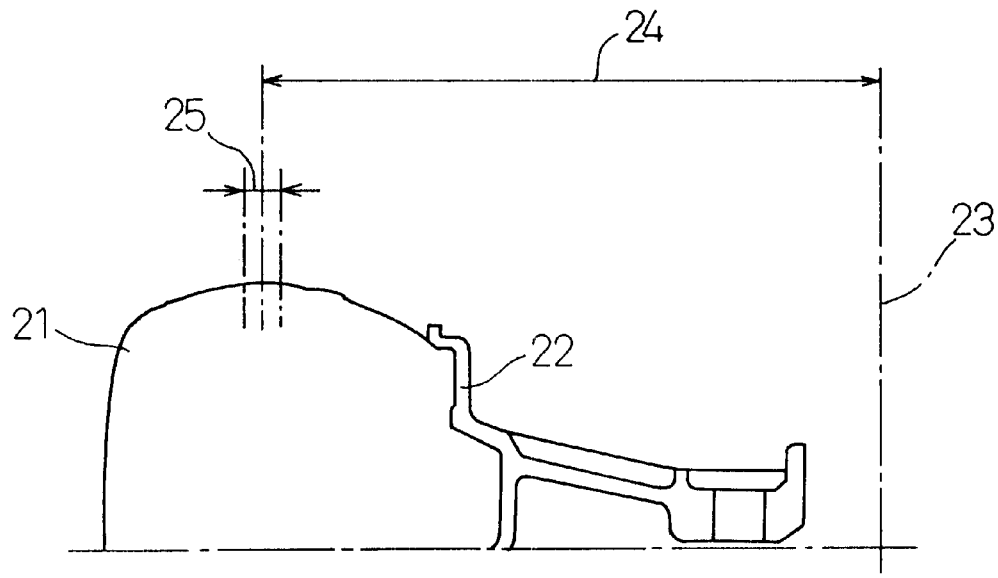
FIG. 2 is a diagram showing an example of selecting a representative point in FIG. 1.

In the example of FIG. 2, the average in a predetermined range of the side wall of the tire 21 centered at a point a predetermined offset 24 away from the wheel axis 23 or the neighborhood average for the curve fitted range 25 is determined as a representative point. Numeral 22 designates a rim flange.

Figure 3:
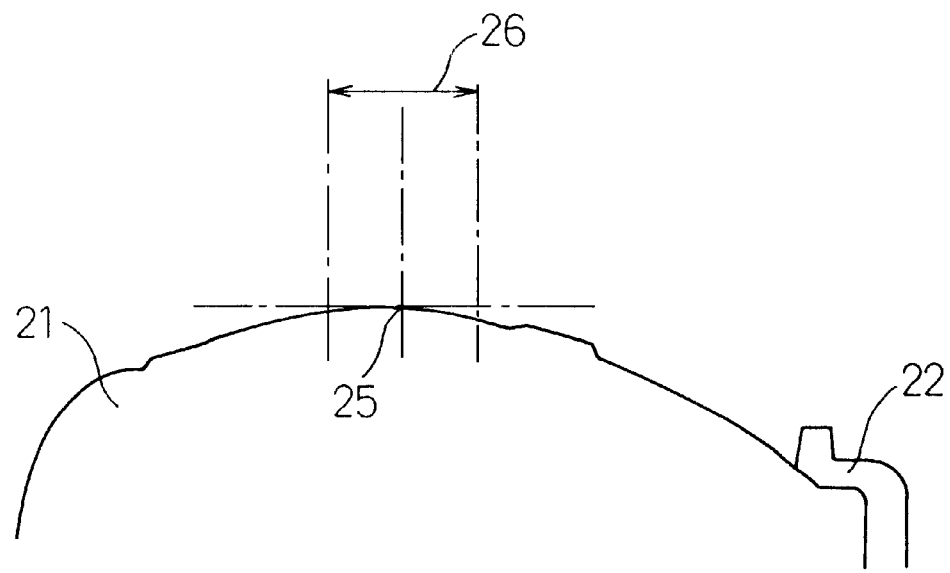
FIG. 3 is a diagram showing another example of selecting a representative point in FIG. 1.

In the case of FIG. 3, the neighborhood average of the side wall top 25 and the curve fitted top of the tire 21 are designated as a representative point.

Figure 4:
FIG. 4 is a diagram showing still another example of selecting a representative point in FIG. 1.

In the case of FIG. 4, the average in the predetermined range 26 from the end of the rim flange 22 is designated as a representative point.

Figure 5:
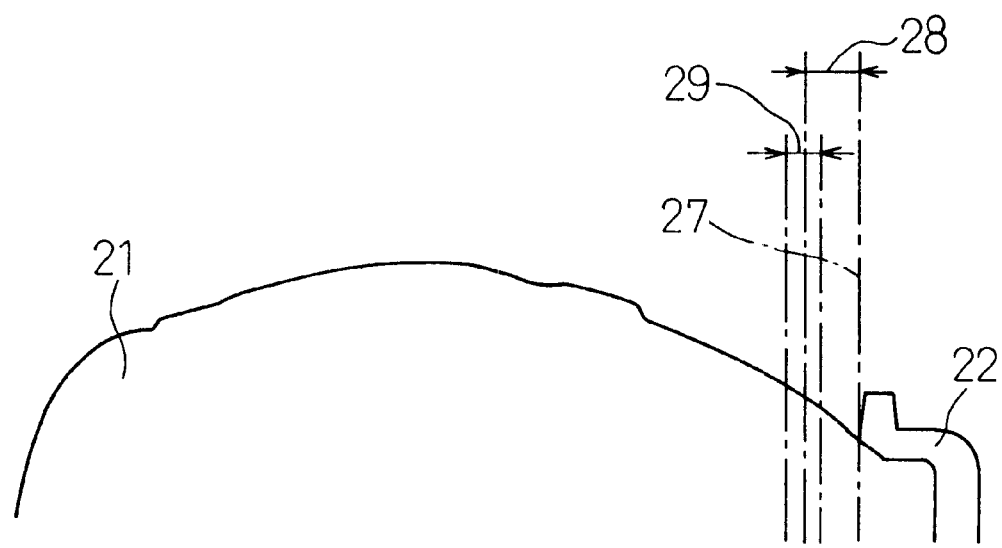
FIG. 5 is a diagram showing a further example of selecting a representative point in FIG. 1.

In the case of FIG. 5, on the other hand, the average in a predetermined-range 29 centered at a position on the tire side wall a predetermined offset 28 away from the end of the rim flange 22 toward the tire is designated as a representative point.

In the case of FIG. 6, the average in a predetermined range 31 centered at a position on the rim flange a predetermined offset 30 away from the end of the rim flange 22 toward the rim flange is designated as a representative point.

Which of the cases of FIGS. 2 to 6 is used for selecting a representative point is determined in accordance with the shape of the wheel involved.

FIGS. 7A and 7B are diagrams for explaining the manner in which the wheel alignment characteristic is calculated based on the detection value obtained by the alignment measuring apparatus shown in FIG. 1. FIG. 7A is a diagram for explaining the manner in which the toe-in angle is calculated, and FIG. 7B a diagram for explaining the calculation of the camber angle.

As shown in FIG. 7A, the toe-in angle α can be determined from the following formula by use of the distance HL from the representative point E2. on the wheel side surface to-the detector $8_2$, the distance HR from the representative point E3 on the wheel side surface to the detector $8_3$ and the distance D between the detectors $8_2$ and $8_3$.

$$\alpha = \arctan(HL-HR)/D$$

Both the detectors $8_2$ and $8_3$ are arranged on a horizontal reference surface 71.

On the other hand, as shown in FIG. 7B, the distance S between the wheel center O and the middle point of the line connecting the detector $8_1$ and the center of the lenses of the detectors $8_2$ and $8_3$ is determined using the distances HL, HR, the distance HV between the detector $8_1$ and-the representative point E1, the distance D between the detectors $8_2$ and $8_3$, and the height L of the detector $8_1$ from the horizontal plane 72 passing through the wheel center. Then, the camber β can be determined from the following formula based on the height LV and the difference between the distance S and the distance HV.

$$\beta = \arctan\{(S-HV)/LV\}$$

Figure 8:
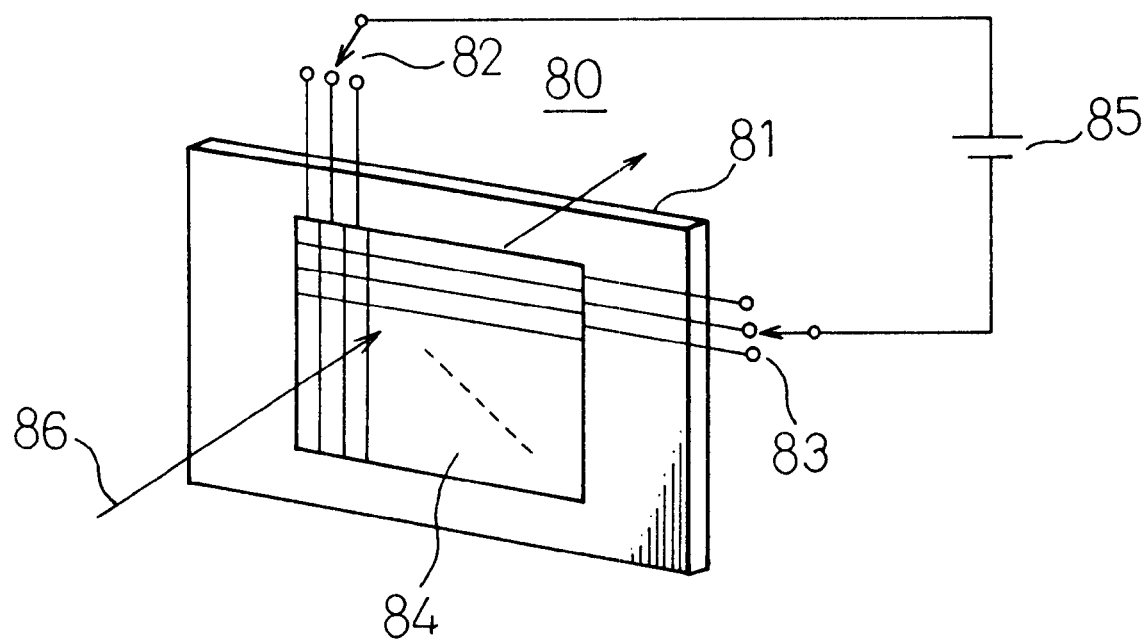
FIG. 8 is a diagram showing a liquid crystal shutter as an example of an electro-optic effect device 6 of the apparatus shown in FIG. 1.

FIG. 8 is a diagram showing a liquid crystal shutter making up an example of the electro-optic effect device 6 of the apparatus shown in FIG. 1. As shown, the liquid crystal shutter 80 includes lattice-shaped liquid crystal elements disposed on a liquid crystal plate 84 on a substrate 81. By controlling switch means 82 and 83, the voltage from the battery 85 is applied to the desired position of the liquid crystal plate 84 so that the laser beam 86 can be controlled to transmit or not through the liquid crystal plate 85. According to this embodiment of the invention, a band-shaped laser beam is transmitted using this liquid crystal shutter thereby to form a linear pattern image on the wheel side surface. Since the tire side wall is curved, however, the image formed on the side wall is actually curved as shown in FIG. 1.

FIG. 9A is a diagram showing a polygon mirror making up another example of the electro-optic effect device of the apparatus shown in FIG. 1. As shown in FIG. 9A, the incident beam 42 is reflected on a mirror surface 42 and can be changed in direction by rotating the polygon mirror 40 with a motor 41. A substantially band-shaped laser beam 43 can be obtained by this operation. An apparatus having substantially the same effect as the apparatus of FIG. 1 can be obtained by radiating the band-shaped laser beam 3 on the wheel side surface 3.

In the case of a one-dimensional line photodetector, in order to indicate the position along the scanning direction of the light source more accurately, a rotational position detector 44 is included in the polygon mirror motor as shown in FIG. 9B, or a half mirror 45 and another one-dimensional line photodetector 46 are included in the scanning light source as shown in FIG. 9C.

Figure 9:
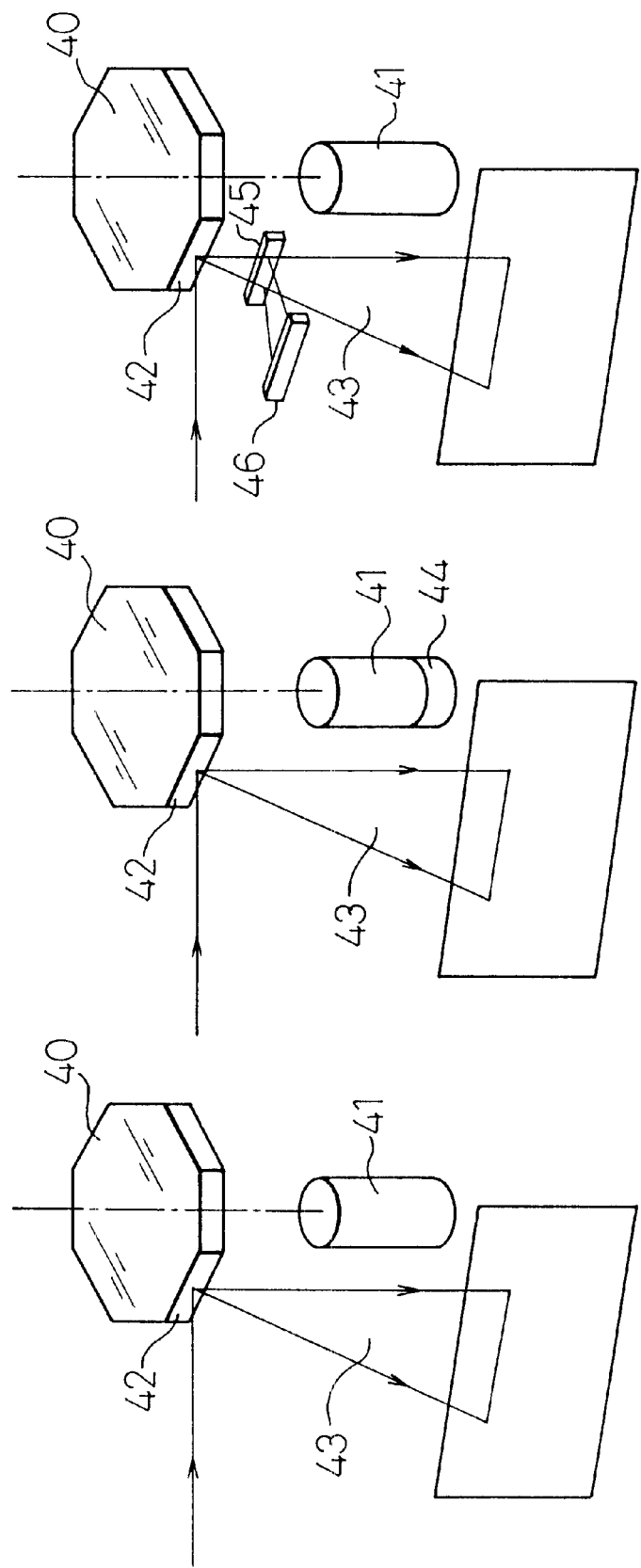
FIG. 9A is a diagram for explaining the apparatus shown in FIG. 1 using a polygon mirror as an example of the electro-optic effect device 6.
FIG. 9B is a diagram showing a rotational position detector included in a polygon mirror driving motor for indicating the position along the light source scanning direction with high accuracy in the case where the one-dimensional line photodetector is used.
FIG. 9C is a diagram showing the case of using a half mirror and another one-dimensional line photodetector as a scanning light source.
Figure 10:
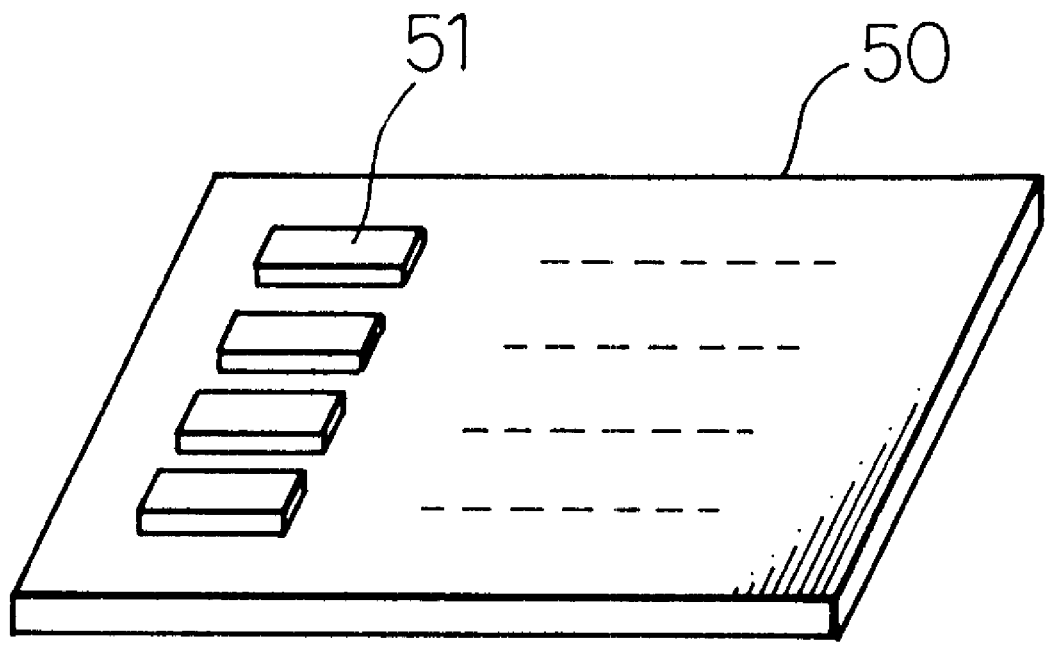
FIG. 10 is a diagram showing a silicon micromirror as another example of the electro-optic effect device in the apparatus of FIG. 11.

FIG. 10 is a diagram showing a silicon micromirror making up another example of the electro-optic effect device of the apparatus shown in FIG. 1. As shown in FIG. 10, the silicon micromirror is composed of a multiplicity of chip-like mirrors 51 called silicon mirrors on a silicon substrate 50. The surface angle of the silicon mirrors 51 can be controlled in the desired direction by electrical drive means (not shown), so that a band-shaped laser beam can be obtained in the same manner as shown in FIG. 9. A silicon micromirror made by Texas Instruments, for example, is known.

Figure 11:
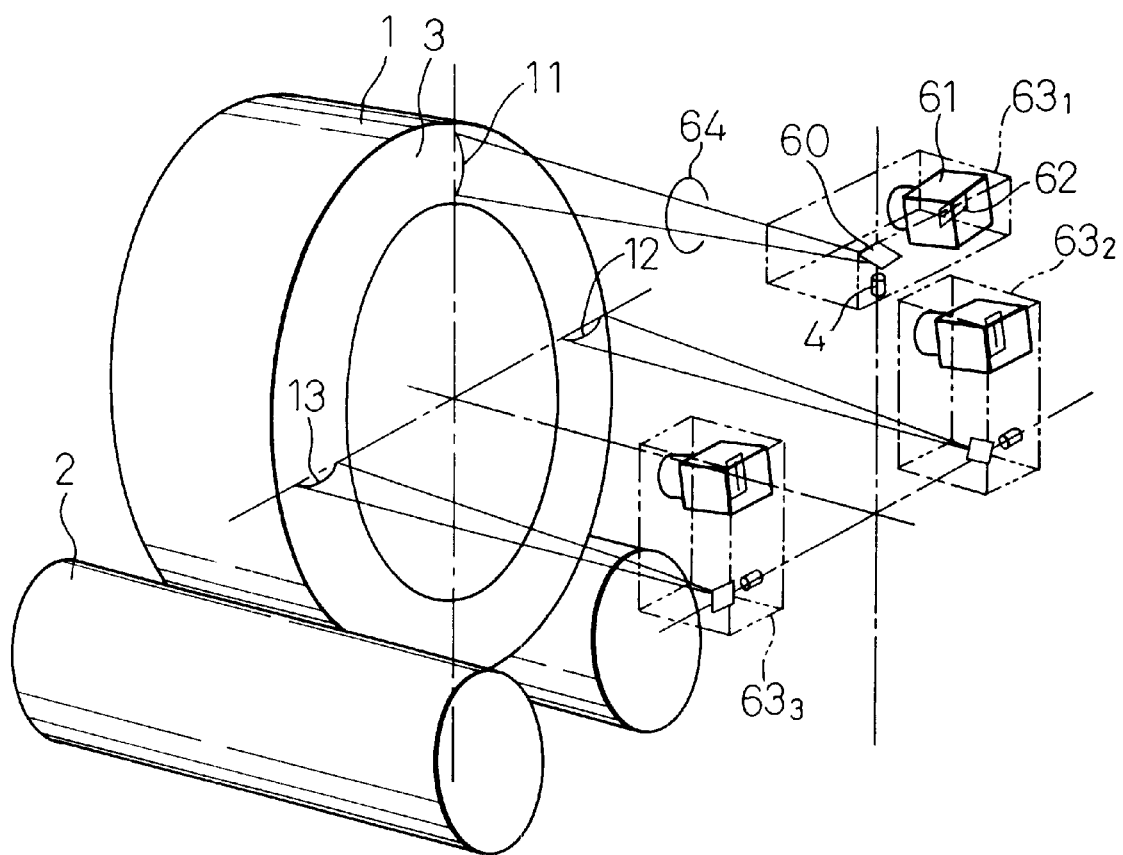
FIG. 11 is a perspective view schematically showing a configuration of an alignment measuring apparatus according to a second embodiment of the invention.

FIG. 11 is a perspective view showing a general configuration of an alignment measuring apparatus according to a second embodiment of the invention. The feature of this embodiment lies in that a scan mirror 60 constituting still another example of the electro-optic effect device of FIG. 1 is employed, the barrel-shaped spreading lens of FIG. 1 is not employed in FIG. 6, and that the photodetecting device 61 includes a one-dimensional line photodetector 62. A laser light source 4, the scan mirror 60 and a photodetecting device 61 make up a detector 631. Detectors 632 and 633 having a similar configuration to the detector 63, are arranged horizontally. The rotational angle of the scan mirror 60 is controlled by drive means (not shown) thereby to control the width of the laser beam 64. Then, a band-shaped laser beam 64 is formed, and like in the apparatus of FIG. 1, a linear-pattern image 11 is formed only on the flat portion of the tire on the side surface of the wheel and the peripheral portion of the rim. Thus, the configuration of FIG. 11 can produce the same effect as the apparatus of FIG. 1. This and subsequently described embodiments comprise means, not shown, corresponding to the drive means and the processing means of FIG. 1.

Figure 12:
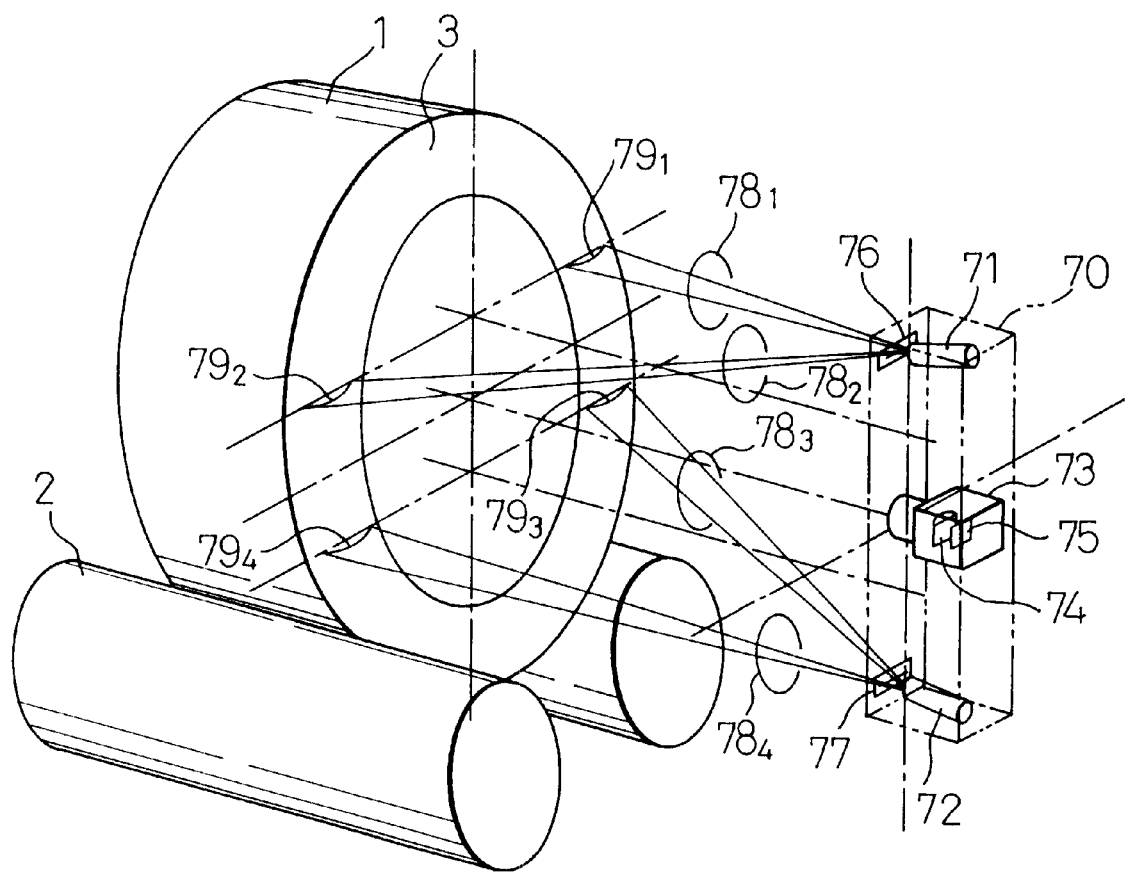
FIG. 12 is a perspective view schematically showing a configuration of an alignment measuring apparatus according to a third embodiment of the invention.

FIG. 12 is a perspective view showing a general configuration of an alignment measuring apparatus according to a third embodiment of the invention. In FIG. 12, a single-detector 70 is included. The detector 70 includes two laser light sources 71, 72, a photodetecting device 73, a liquid crystal shutter 76 arranged before the laser light source 71 and a liquid crystal shutter 77 arranged before the laser light source 72. The photodetecting device 73 includes a barrel-shaped lens 74 and an area photodetector 75.

By controlling the liquid crystal shutter 76 with drive means not shown, a part of the laser beam emitted from the laser light source 71 is transmitted through the liquid crystal shutter 76 to form two band-shaped laser beams $78_1$, $78_2$, which are radiated on the wheel side surface thereby to form images $79_1$, $79_2$. In this case, as in the case of FIG. 1, the liquid crystal shutter 76 is controlled in such a manner as to form the images $79_1$, $79_2$ only on the flat tire portion of the wheel side surface and the peripheral portion of the rim.

In similar fashion, the liquid crystal shutter 77 is controlled by a drive means, not shown, so that a part of the laser beam emitted from the laser light source 71 is transmitted through the liquid crystal shutter 77 to form two band-shaped laser beam $78_3$, $78_4$, which are radiated on the wheel side surface to form images $79_3$, $79_4$. In this case, as in the case of FIG. 1, the liquid crystal shutter 77 is controlled in such a manner as to form the images $79_3$, $79_4$ only on the flat tire portion of the wheel side surface and the peripheral portion of the rim.

In FIG. 12, the laser beam emitted from the laser light source 71 is not parallel to the laser beam emitted from the laser light source 72. In order to secure unparallel laser beams in this way, the laser light sources 71, 72 are required to be arranged non-parallel to the horizontal plane. Although the detector 80 increases in size, the angle formed between the wheel side surface 3 and the band-shaped laser beams $78_1$ to $78_4$ radiated on the wheel side surface 3 is different from 90°. Thus, the photodetecting device 73 can detect the change of the positions of the representative points (points such as E1 to E3 shown in FIG. 1) of linear images $79_1$ to $79_4$ on the wheel side surface 3 with higher accuracy than when the laser beams are parallel to each other. By determining an arbitrary three of the four representative points of the four images $79_1$ to $79_4$, the toe-in angle and the camber angle can be calculated as in the apparatus of FIG. 1.

Figure 13:
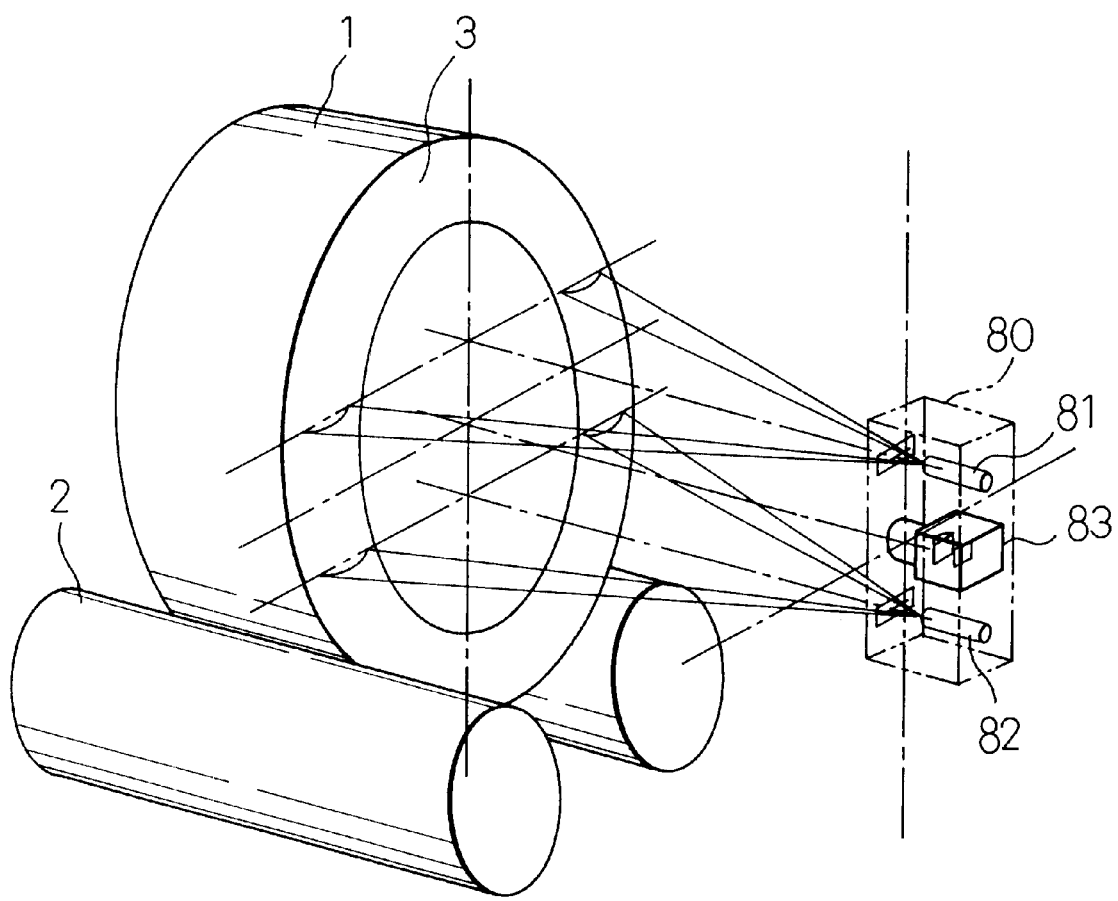
FIG. 13 is a perspective view schematically showing a configuration of an alignment measuring apparatus according to a fourth embodiment of the invention.

FIG. 13 is a perspective view showing a general configuration of an alignment measuring apparatus. according to a fourth embodiment of the invention. As compared with the embodiment of FIG. 12 in which the laser light sources 71 and 72 are arranged non-parallel to each other, the present embodiment is different only in that the laser light sources 81 and 82 are arranged parallel to each other. The configuration of FIG. 13 can reduce the size of the detector 80 as compared with that of FIG. 7. Although the detection accuracy of the detector 83 is somewhat lower than that of FIG. 7, the configuration of FIG. 13 has a sufficient practical value.

Figure 14:
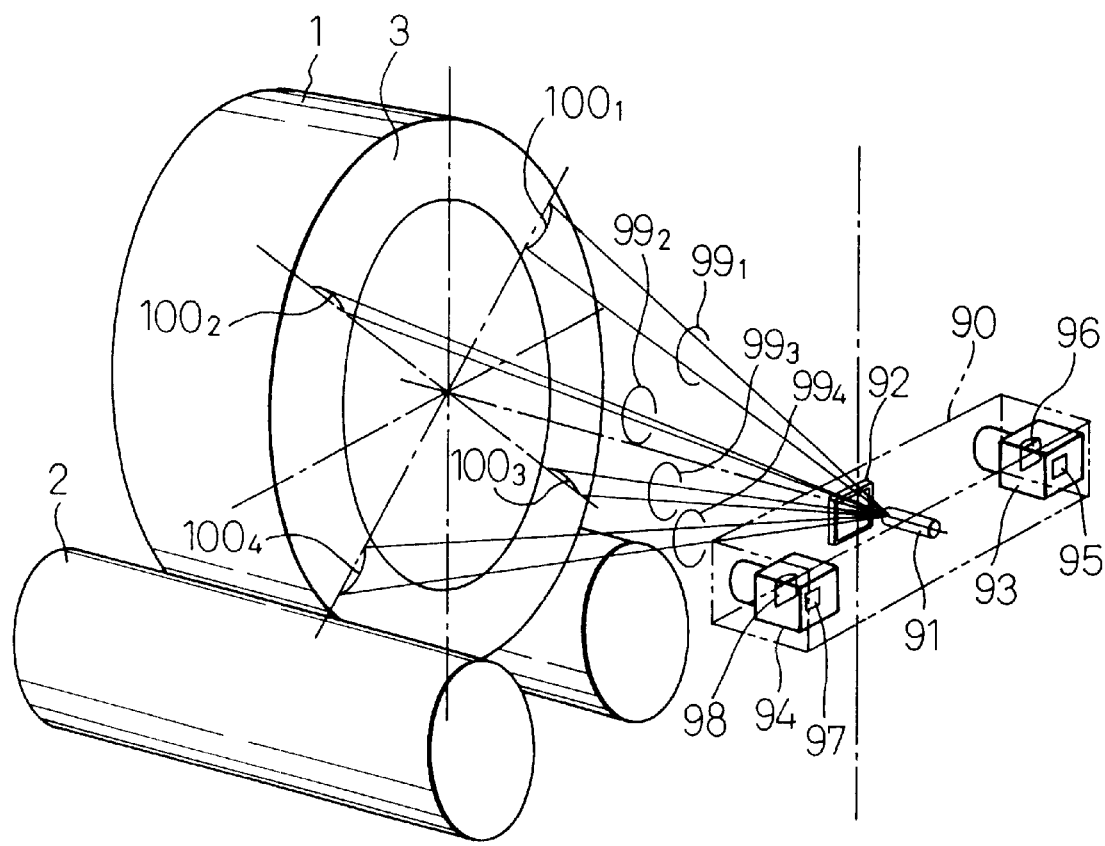
FIG. 14 is a perspective view schematically showing a configuration of an alignment measuring apparatus according to a fifth embodiment of the invention.

FIG. 14 is a perspective view showing a general configuration of an alignment measuring apparatus according to a fifth embodiment of the invention. In FIG. 14, a single detector 90 is included. The detector 90 includes a single laser light source 91, a liquid crystal device 91 and two photodetecting devices 93, 94. By controlling the liquid crystal shutter 92 with drive means not shown, a part of the laser beam emitted from the laser light source 91 is transmitted through the liquid crystal shutter 92 to form four band-like laser beams $99_1$ to $99_4$, which in turn are radiated on the wheel side surface 3 thereby to form images $100_1$ to $100_4$. In this case, as in FIG. 1, the liquid crystal shutter 92 is controlled in such a manner that the images $100_1$ to $100_4$ are formed only on the flat tire portion of the wheel side surface 3 and the peripheral portion of the rim.

In FIG. 14, like in FIGS. 12 and 13, once three arbitrary representative points of the four images $100_1$ to $100_4$ are determined, the toe-in angle and the camber angle can be calculated.

Figure 15:
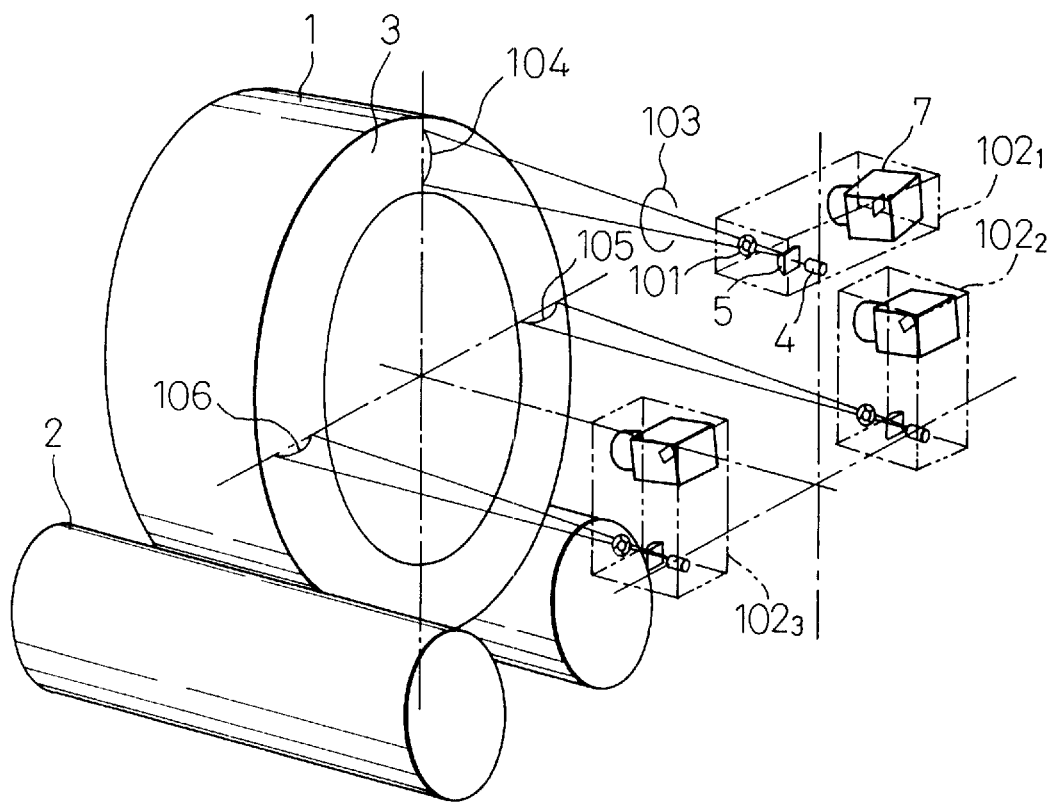
FIG. 15 is a perspective view schematically showing a configuration of an alignment measuring apparatus according to a sixth embodiment of the invention.

FIG. 15 is a perspective view showing a general configuration of an alignment measuring apparatus according to a sixth embodiment of the invention. This embodiment is different from the embodiment of FIG. 1 in that the electro-optic effect device of FIG. 1 is replaced by an electromagnetic effect device 101 as a means for controlling the width of the laser beam in each of the detectors $102_1$ to $102_3$ in FIG. 15, the remaining configuration being the same as in FIG. 1. Also with the electromagnetic effect device 101, only the band-shaped laser beam 103 is passed from the laser beam having a section of a predetermined geometric pattern and radiated only on the required places including the comparatively flat central portion of the tire on the wheel side surface and the peripheral portion of the rim, thereby making it possible to more positively prevent the irregular reflection which might otherwise be caused by the laser beam radiated on uneven places such as the aluminum wheel spokes, the tire side ends or the body fender.

Figure 16:
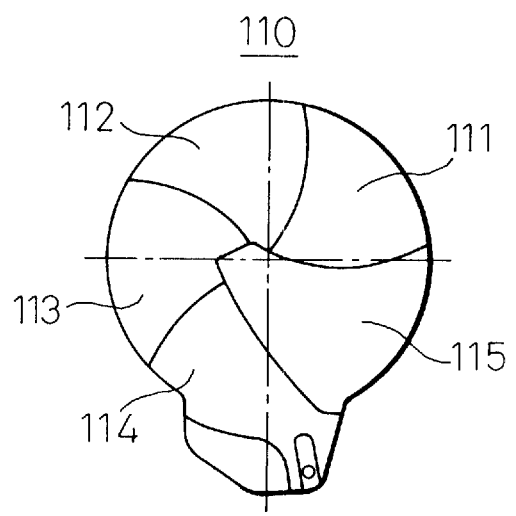
FIG. 16 is a diagram showing an iris shutter as an example of the electromagnetic effect device in the apparatus shown in FIG. 15.

FIG. 16 is a diagram showing an iris shutter as an example of the electromagnetic effect device 101 of the apparatus shown in FIG. 15. As shown in FIG. 16, the iris shutter, which has a well-known structure used in cameras and the like, is adapted to open/close the central hole by moving a plurality of blades 111 to 115 by a drive unit not shown. A laser beam having a section of a predetermined geometric pattern is radiated by an optical system including a laser light source 4 and a barrel-shaped lens 5. By passing the laser beam through the hole of the iris shutter, therefore, a substantially band-shaped laser beam 103 can be obtained.

Figure 17:
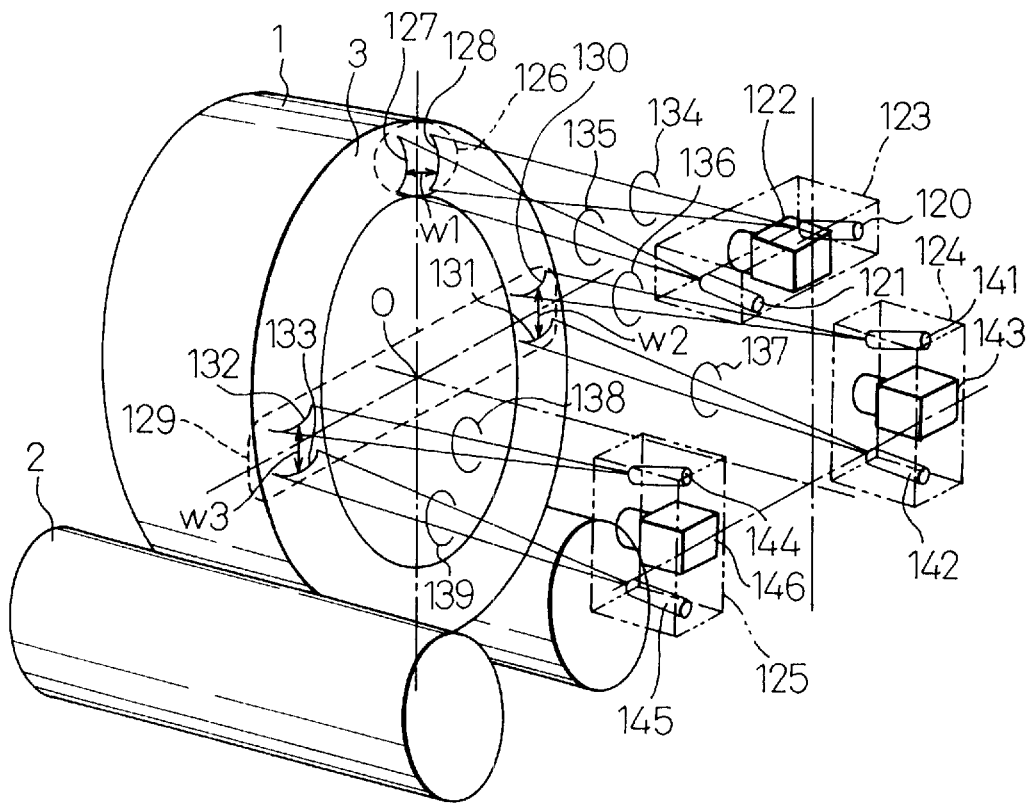
FIG. 17 is a perspective view showing a general configuration of an alignment measuring apparatus according to a seventh embodiment of the invention.

FIG. 17 is a perspective view showing an alignment measuring apparatus according to a seventh embodiment of the invention. In FIG. 17, numerals 120, 121 designate laser light sources, numeral 122 a photodetecting device, numeral 123 a detector including the two laser light sources 120, 121 and the photodetecting device 122. Numerals 124, 125 designate detectors having a similar configuration to the detector 123.

The two laser light sources 120, 121 of the detector 123 form two vertical patterns 127, 128 having different tops 126 of the wheel side surface 3.

The two laser light sources of the detector 124 form two different horizontal patterns 130, 131 on the right side of the central portion 129 of the wheel side surface.

The two laser light sources of the detector 125 form two different horizontal patterns 132, 133 on the left side of the central portion 129 of the wheel side surface. The photodetecting device 120 may include either a line photodetector or an area photodetector in accordance with the shape of the geometric pattern emitted from the laser light sources 120, 121.

The three detectors 123 to 125 are arranged in the following manner.

Specifically, the detector 123 for radiating the laser beam on the top 126 of the wheel side surface 3 is located in such a position that the optical axis of the detector 123 passes through the top 126 of the vertical contour line of the tire wheel formed by the vertical section perpendicular to the vehicle axle through the wheel center O. The two left and right detectors 124, 125, on the other hand, are located in such positions that the optical axes of the detectors 124, 125 pass through the tire wheel side surface of the horizontal contour line formed by the horizontal section parallel to the vehicle axle through the wheel center O.

The two laser light sources 121, 122 included in the detector 123 are arranged non-parallel to each other, so that the band-shaped laser beams 134 and 135 are non-parallel to each other.

The unparallelism of the band-shaped laser beams improves the detection accuracy as compared with the parallel band-shaped laser beams.

As explained with reference to FIGS. 18 to 20, the toe-in angle and the camber angle of the wheel can be determined by measuring the change in the distance w1 between the vertical pattern images 127, 128, the distance w2 between the horizontal pattern images 130, 131 and the distance w3 between the horizontal pattern images 132, 133.

Figure 18:
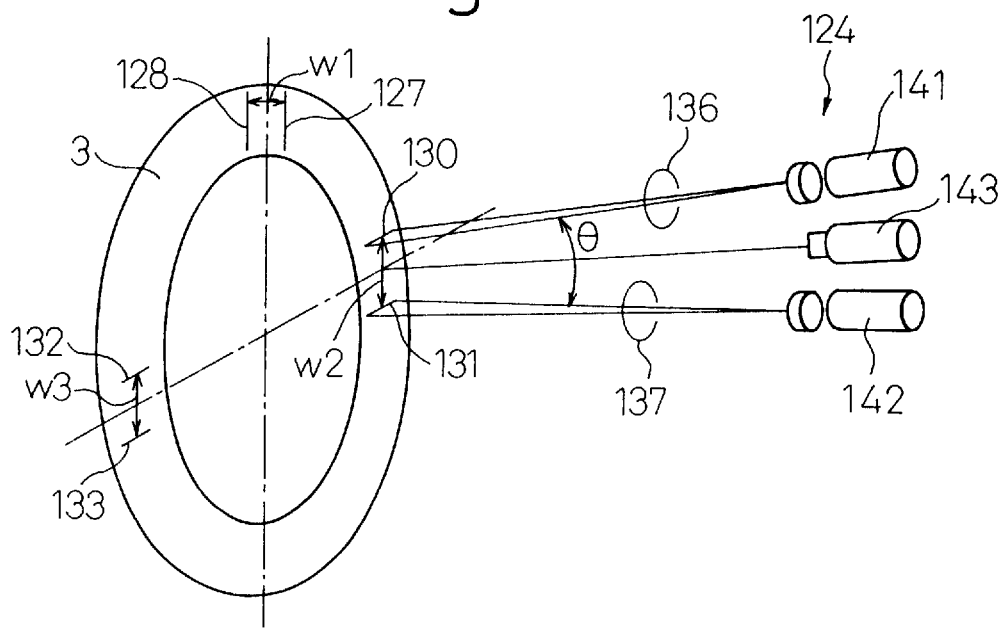
FIG. 18 is a diagram schematically showing a part of the apparatus of FIG. 17.

FIG. 18 is a diagram showing a part of the apparatus of FIG. 17 as a model. In FIG. 18, the angle formed by the laser beams 136, 137 emitted from the laser light sources 141, 142 in the detector 124 is given as θ.

Figure 19:
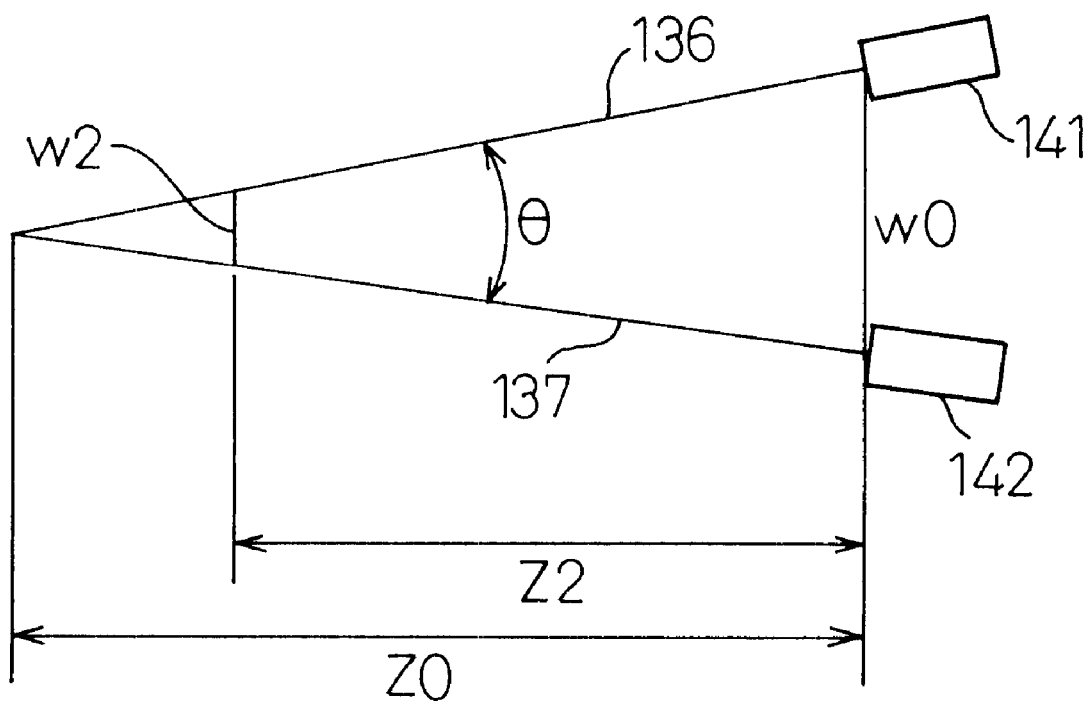
FIG. 19 is a diagram showing more schematically the same part of FIG. 18.

FIG. 19 is a diagram showing another model of FIG. 18. The angle formed by the laser beams 136 and 137 emitted from the laser light sources 141, 142 is given as θ. The laser beams 136 and 137 cross each other at a point the distance $z0$ away from the laser light sources 141, 142. By predetermining the angle θ and the distance $w0$ between the laser light sources, 141, 142, the distance $z0$ is determined as a known value regardless of the tire rotation or the toe-in angle or the camber angle. The distance $z2$ from the laser light sources 141, 142 to the patterns 130, 131 can be calculated as follows by measuring the distance $w2$ between the pattern images.

$$w2=\{(z0-z2)/z0\}\times w0$$

$$w0=2z0+\tan\theta/2$$

Therefore, $w2=2(z0-z2)\tan\theta/2$
Thus, $$z2 = (2z0\tan\theta/2 - w2)/2\tan\theta/2$$

$$= z0 - w2/2\tan\theta/2$$

In similar fashion, the distance $z1$ from the laser light sources 120, 121 to the pattern images 127, 127, and the distance $z3$ from the laser light sources 144, 145 to the pattern images 132, 133 can be determined from the following-formulae.

$$z1=z0-w1/2\tan\theta/2$$

$$z3=z0-w3/2\tan\theta/2$$

Thus, the toe-in angle α is given as $$\alpha = \arctan(z3 - z2)/D$$

$$= \arctan\{(w3-w2)/2D\tan\theta/2\}$$

where D is the distance between the detectors 124 and 125 of the horizontal portion. Also, the camber angle β is given as $$\beta=\arctan\{(2w1-w3-w2)/2D\tan\theta/2\}$$

As described above, according to the seventh embodiment of the invention explained with reference to FIGS. 17 to 19, a double-line image-is formed on the wheel side surface, and the distance between the two lines is measured. In this way, the tire alignment can be measured without using the trigonometry unlike in the prior art. The laser beam is not necessarily applied at exactly right angles to the tire or the wheel, not is it necessary for the photodetector to receive-the-light reflected from the wheel side surface at exactly right angles. As a result, the mounting error in the installation and the aged deterioration and configuration of the detector have only a small effect for an improved operability.

Figure 20:
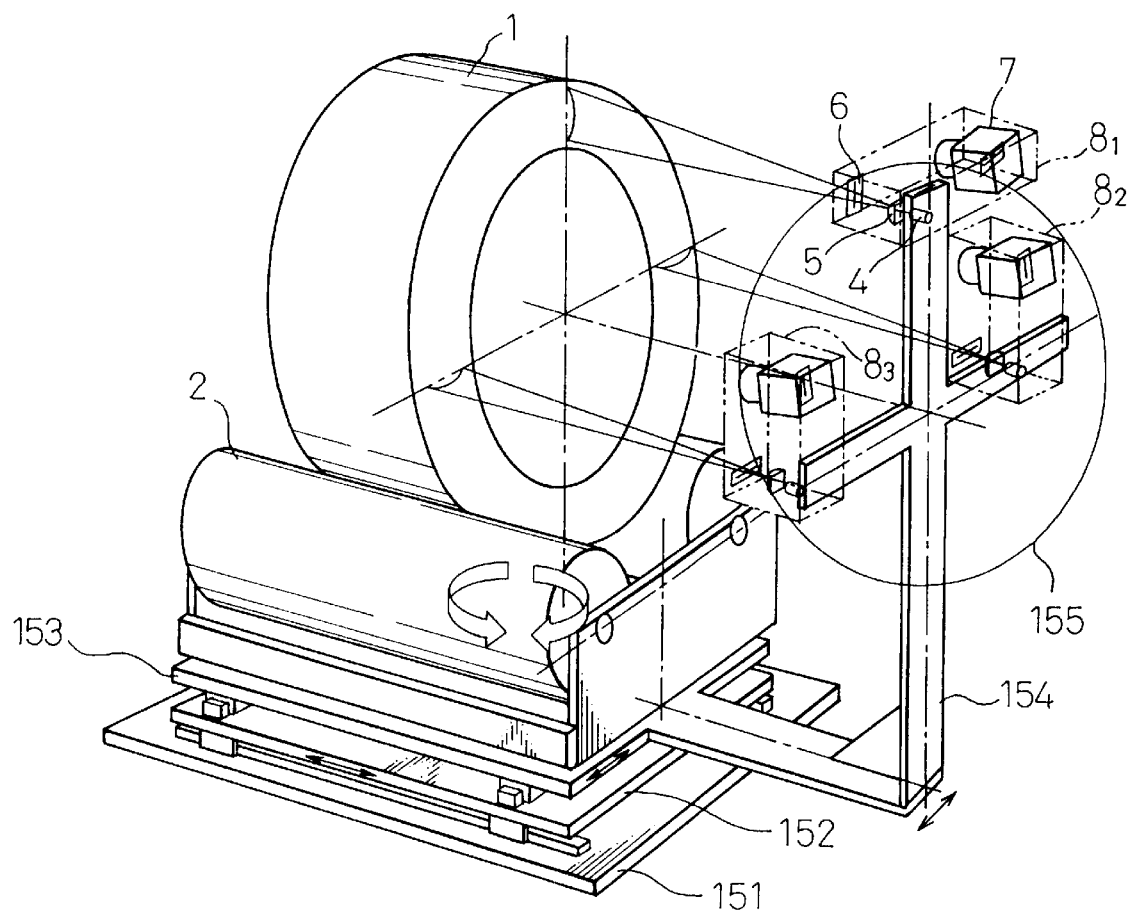
FIG. 20 is a perspective view showing a general configuration of an alignment measuring apparatus according to an eighth embodiment of the invention.

FIG. 20 is a perspective view showing a general configuration of an alignment measuring apparatus according to an eighth embodiment of the invention.

In manufacturing a vehicle, it is difficult to fabricate the wheel base exactly to the design value. In the case where there is a great difference between the left and right wheel bases of a completed vehicle, it sometimes occurs that the toe-in angle and the camber angle cannot be accurately measured with the apparatus of FIG. 1. This tendency is conspicuous especially with the contact-type apparatus. With the non-contact apparatus of a peak-point detection type using the laser beam cut-off method, on the other hand, it is difficult to determine a peak point positively in the case where the profile of the tire side wall assume an almost linear gentle curve or a complicated shape having two or more peaks.

In view of this situation, this embodiment additionally includes a wheel center tracking mechanism. In FIG. 20, numeral 151 designates a base plate, numeral 152 a lateral floating plate, numeral 153 a longitudinal floating plate, and numeral 154 a cross-shaped fixed member having the detectors $8_1$ to $8_3$ mounted thereon. The fixed member 154 is formed integrally with the longitudinal floating plate 153.

Figure 21:
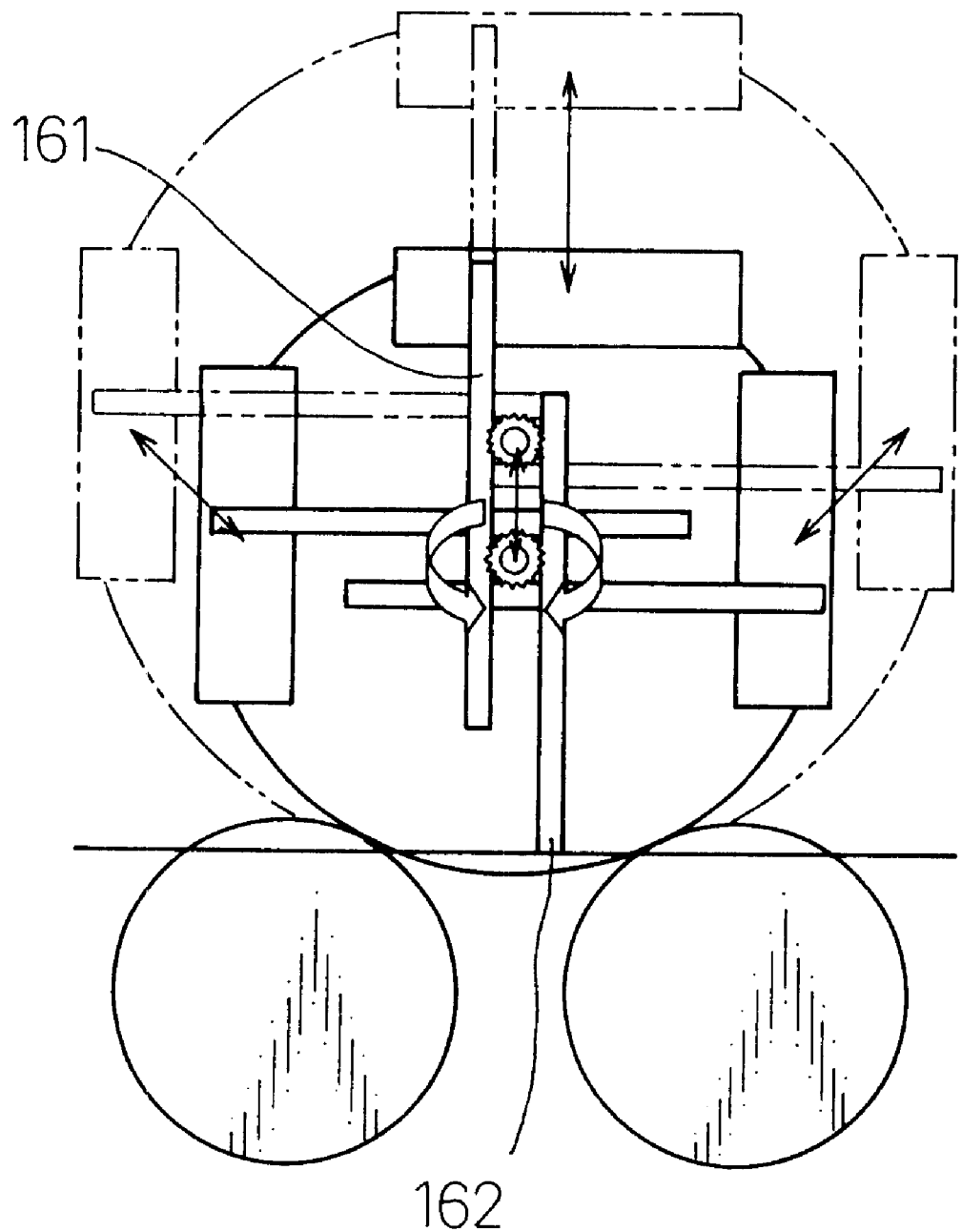
FIG. 21 is a side view showing in detail a part of the members in FIG. 20.

FIG. 21 is a side view showing in detail the cross portion 155 of the fixed member 154 in FIG. 20. In FIG. 21, numeral 161 designates a rack-pinion sync unit and numeral 162 a rack fixed portion.

The positions of the detectors $8_1$ to $8_3$ can be finely adjusted by moving the lateral floating plate 152 and/or the longitudinal floating plate 153 along the directions of arrows with the mechanism shown in FIGS. 20 and 21.

Figure 22:
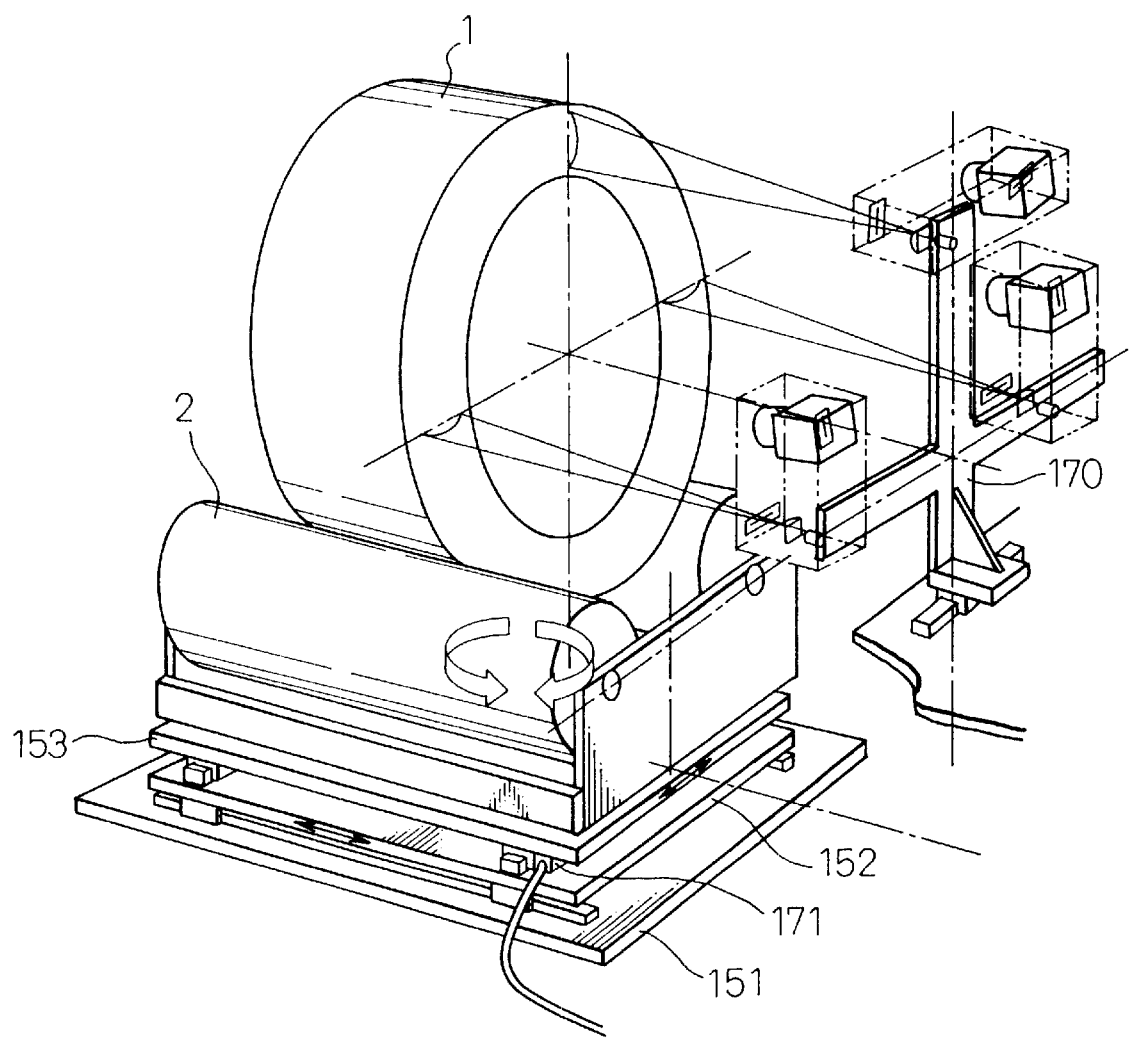
FIG. 22. is a perspective view showing a general configuration of an alignment measuring apparatus according to a ninth embodiment of the invention.

FIG. 22 is a perspective view showing a general configuration of an alignment measuring apparatus according to a ninth embodiment of the invention. According to this embodiment, the cross-shaped fixed member 170 is not formed integrally with the longitudinal floating plate 153. Instead, the information on the longitudinal position from a longitudinal floating amount detector 171 is applied to the detectors $8_1$ to $8_3$ and the processing means 14 thereby to correct the lateral difference of the wheel base and the variation of the wheel center at the time of turning the wheels.

Figure 23:
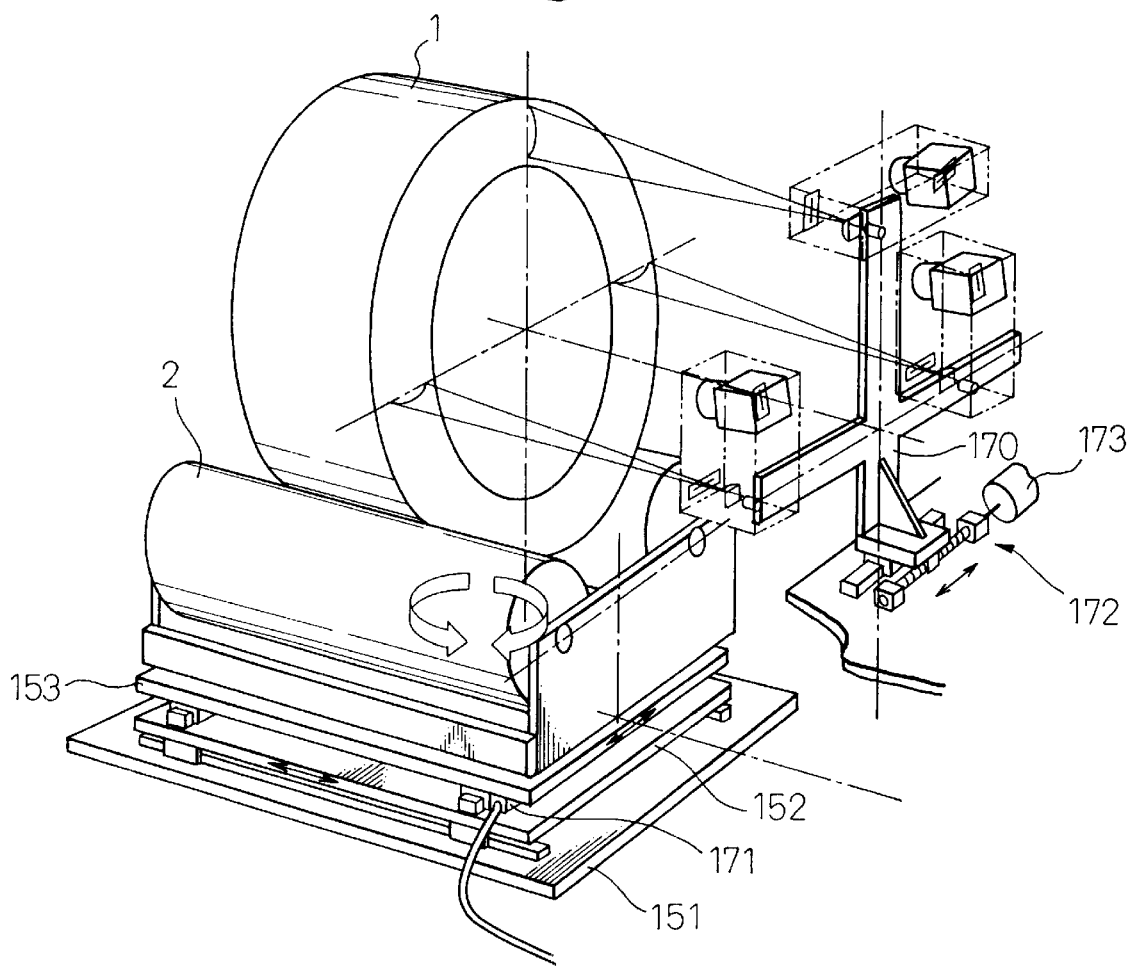
FIG. 23 is a perspective view showing a configuration in which the fixed member of FIG. 22 is replaced by a movable member.

FIG. 23 shows an example in which the fixed member 170 in FIG. 22 is made movable by a longitudinal travel guide 172, a ball screw 173 and a servo motor 174, so that the wheel center variation exceeding the detection area of the detectors $8_1$ to $8_3$ can be handled by tracking the longitudinal position error with the wheel center.

Figure 24:
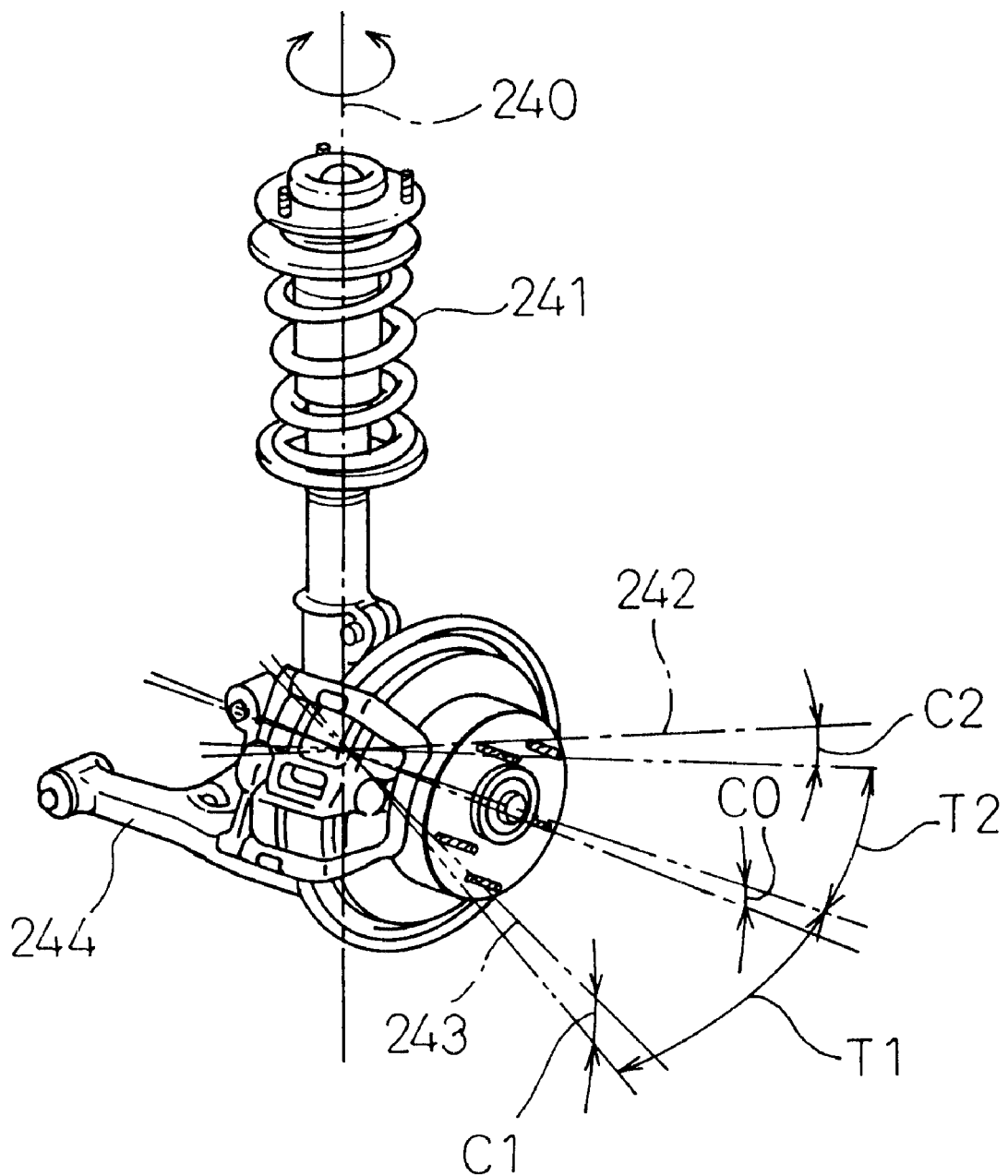
FIG. 24 is a diagram for explaining the manner in which the caster angle of the alignment characteristics of the wheel with a turning mechanism is calculated.

FIG. 24 is a perspective view showing a method of measuring the caster angle by turning. In FIG. 24, numeral 240 designates a turning shaft, numeral 241 a strut, numeral 242 a spindle (axle) for left turn, numeral 243 a spindle (axle) for right turn, numeral 244 a lower arm, character C0 a camber for toe zero, character C1 a camber for right turn, character C2 a camber for left turn, character T1 a toe for right turn and character T2 a toe for left turn. A conventional method is known in which the caster angle from the amount of the change of the camber and the toe-in angle, i.e. the left and right steering angles by contacting the wheel side surface when turning the steering wheel to the left or right is calculated from the following formula.

The caster angle K is given as $$K = \arctan\left(\frac{\sin C1 - \sin C2}{\cos C2 \cdot \sin T2 - \cos C1 \cdot \sin T1} - \frac{\cos C2 \cdot \cos T2 - \cos C1 \cdot \cos T1}{\cos C2 \cdot \sin T2 - \cos C1 \cdot \sin T1} \cdot \tan S\right)$$

where S is the king pin angle, and the approximation formula is $$K = \frac{180}{\pi} \cdot \left(\frac{C1 - C2}{T2 - T1}\right)$$

According to this embodiment of the invention, the wheel side surface is not contacted at the time of turning the steering wheel and therefore it is possible to measure both the toe-in angle and the camber satisfactorily and thus to improve the caster measurement accuracy.

Further, in the situation where the rotational angle of the wheel is increased, when measuring the steering angle and the caster, by turning the steering wheel accompanied by a large amount of movement of the wheel center, the steering angle and the caster angle can be measured satisfactorily if the representative points as shown in FIGS. 4, 5 and 6 can be selected for measuring the toe-in angle and the camber. In the case where the representative points other than shown in FIG. 2 or 3 cannot be selected, however, the correction by the wheel center tracking mechanism is very effective.

It will thus be understood from the foregoing description that, according to this invention, the laser beam from the laser light source is radiated only in a predetermined range of the wheel side surface, and therefore the chance of disturbances such as the irregular reflection can be suppressed in advance. Also, the radiation-range of the light source and the method of determining representative points can be variably controlled in keeping with the shape and material. As a result, the alignment characteristics of various types of wheels can be measured with versatility and high accuracy. Further, the alignment can be measured more rapidly and more accurately than in the prior art by limiting the processing only in the required range of the visual field.

Further, the two images formed on the tire side surface or the wheel by the laser beams emitted from the two laser light sources are converted into image data by a photodetecting device, and then processed in the processing means to measure the change in the distance between the two images corresponding to the tire rotation. In this way, the inclination angle of the wheel can be measured.

The distance between the two images on the tire or the wheel is not dependent on the distance between the laser light sources and the photodetecting device, and the laser beams and the reflected beams proceeding toward the photodetecting device are not necessarily exactly at right angles to the surface of the tire or the wheel. Therefore, the mounting error or the aged deterioration in mounting or calibrating the laser light sources or the photodetecting device have only a small effect for an improved operability.

The wheel center tracking mechanism compensates for the disadvantage of the conventional non-contact apparatus which develops an error in the case of a large toe-in or camber angle, and provides a method for a highly accurate non-contact measurement of the turning angle of the steering wheel or the caster angle in the turning system.

Also, in the electrical tracking mechanism, the change in the toe-in or camber angle due to the tension of the vehicle driven by the motor during the measurement can be easily corrected by software control for a further improved accuracy.

What is claimed is:

1. An apparatus for measuring the alignment of a vehicle wheel, in rotation, in a non-contact fashion, comprising:

a laser light source for emitting a laser beam having a section of a geometric pattern toward at least the wheel side surface;

laser beam control means for controlling the width of said laser beam from said laser light source in such a manner as to radiate only a predetermined range of the wheel side surface;

a photodetecting device for receiving the laser beam controlled by said laser beam control means and reflected in said predetermined range of said wheel side surface and converting said laser beam into a corresponding image data; and processing means for processing said image data and calculating said wheel alignment.

2. An alignment measuring apparatus according to claim 1, wherein said laser beam control means is an electro-optic effect device for controlling the width of said laser beam in such a manner that the laser beam from said laser light source means is radiated only in a predetermined range on the wheel side surface.

3. An alignment measuring apparatus according to claim 2, wherein said electro-optic effect device is a scan mirror for temporally differentiating the radiation angle of said laser beam in accordance with an electrical control signal in such a manner that the laser beam from said laser light source means is radiated only in a predetermined range on the wheel side surface.

4. An alignment measuring apparatus according to claim 2, comprising a plurality of pairs of said laser light source means and said electro-optic effect device, wherein said plurality of said pairs of the laser light source means and said single photodetecting device make up a detector, and each of said plurality of said pairs of the laser light source means radiates the laser beam on a different position on said wheel side surface.

5. An alignment measuring apparatus according to claim 4, wherein said plurality of said pairs of the laser light source means are arranged in such a manner as to radiate unparallel laser beams on said wheel side surface.

6. An alignment measuring apparatus according to claim 4, wherein said plurality of said pairs of the laser light source means are arranged in such a manner as to radiate parallel laser beams on said wheel side surface.

7. An alignment measuring apparatus according to claim 2, further comprising drive means for changing the angle of the laser beam radiated on said wheel side surface by said laser light source means and said electro-optic effect device.

8. An alignment measuring apparatus according to claim 1, wherein said laser light source means, said laser beam control means and said photodetecting device make up a detector, said apparatus comprising at least another two detectors having the same configuration as said first detector; and wherein said first detector is for detecting the top position of said wheel side surface and said second and third detectors are for detecting the positions of the horizontal portion of said wheel side surface.

9. An alignment measuring apparatus according to claim 1, wherein said photodetecting device includes a one-dimensional line photodetector for receiving the laser beam reflected in said predetermined range on said wheel side surface and converting said laser beam into a corresponding image data.

10. An alignment measuring apparatus according to claim 1, wherein said photodetecting device includes a two-dimensional area photodetector for receiving the laser beam reflected in said predetermined range on said wheel side surface and converting said laser beam into corresponding image data.

11. An alignment measuring apparatus according to claim 1, wherein said detector includes a first detector and a second detector for detecting the laser beams reflected from two different horizontal positions, and wherein said processing means includes means for extracting a first representative point from the image data detected by said first detector, means for extracting a second representative point from the image data detected by said second detector, and means for calculating the toe-in angle based on the difference between the first distance between said first representative point and a horizontal reference plane and the second distance between said second representative point and said horizontal reference plane.

12. An alignment measuring apparatus according to claim 11, wherein said detector further includes a third detector for detecting the laser beam reflected from a third position different from said two positions, and wherein said processing means includes means for extracting a third representative point from the image data detected by said third detector, and means for calculating the camber angle from the positions of said first representative point, said second representative point and said third representative point.

13. An alignment measuring apparatus according to claim 11 or 12, wherein said representative points are each extracted according to the geometric features including a point or a section a predetermined distance from a reference point of the detector, and the top or a bent point of the image data of the detector.

14. An apparatus for measuring the alignment of a vehicle wheel in rotation in a non-contact fashion according to claim 11, comprising means for stopping the wheel and extracting two representative points defining the horizontal angle of the side surface of the stationary wheel with respect to the axle having a turning mechanism, and means for calculating the steering angle from the difference between the distances of the representative points.

15. An apparatus for measuring the alignment of a vehicle wheel in rotation in non-contact fashion according to claim 12, comprising means for stopping the wheel and extracting three representative points defining the plane of the stationary wheel side surface with the axle having a turning mechanism, and means for calculating the caster angle from the positions of said representative points.

16. An alignment measuring apparatus according to claim 1, wherein said laser beam control means is an electromagnetic effect device for reducing the width of said laser beam by an electrical signal in such a manner that the laser beam from said laser light source means is radiated only in a predetermined range on the wheel side surface.

17. An alignment measuring apparatus for measuring the alignment of a vehicle wheel in rotation in a non-contact fashion, comprising:
   a laser light source for emitting a laser beam having a section of a geometric pattern toward at least the wheel side surface;
   laser beam control means for controlling the width of said laser beam from said laser light source in such a manner as to radiate only a predetermined range of the wheel side surface;
   a photodetecting device for receiving the laser beam controlled by said laser beam control means and reflected in said predetermined range of said wheel side surface and converting said laser beam into a corresponding image data; and
   processing means for processing said image data and calculating said wheel alignment, wherein said laser beam control means is an electro-optic effect device for controlling the width of said laser beam in such a manner that the laser beam from said laser light source means is radiated only in a predetermined range on the wheel side surface, wherein said electro-optic effect device is a liquid crystal shutter for transmitting a part of said laser beam in accordance with an electrical control signal in such a manner that the laser beam from said laser light source means is radiated only in a predetermined range on the wheel side surface.

18. An alignment measuring apparatus according to claim 17, comprising a single pair of the laser light source and said liquid crystal shutter, wherein said single pair of said laser light source and said liquid crystal shutter make up a detector with at least two photodetecting devices, and wherein said liquid crystal shutter radiates the laser beam at least on four different positions on said wheel sided surface.

19. An alignment measuring apparatus for measuring the alignment of a vehicle wheel, in rotation, in a non-contact fashion, comprising:
   a laser light source for emitting a laser beam having a section of a geometric pattern toward at least the wheel side surface;
   laser beam control means for controlling the width of said laser beam from said laser light source in such a manner as to radiate only a predetermined range of the wheel side surface;
   a photodetecting device for receiving the laser beam controlled by said laser beam control means and reflected in said predetermined range of said wheel side surface and converting said laser beam into a corresponding image data; and
   processing means for processing said image data and calculating said wheel alignment, wherein said laser beam control means is an electro-optic effect device for controlling the width of said laser beam in such a manner that the laser beam from said laser light source means is radiated only in a predetermined range on the wheel side surface, wherein said electro-optic effect device is a silicon micromirror for reflecting a part of said laser beam in accordance with an electrical control signal in such a manner that the laser beam from said laser light source means is radiated only in a predetermined range on the wheel side surface.

20. An alignment measuring apparatus for measuring the alignment of a vehicle wheel, in rotation, in a non-contact fashion, comprising:
   a laser light source for emitting a laser beam having a section of a geometric pattern toward at least the wheel side surface;
   laser beam control means for controlling the width of said laser beam from said laser light source in such a manner as to radiate only a predetermined range of the wheel side surface;
   a photodetecting device for receiving the laser beam controlled by said laser beam control means and reflected in said predetermined range of said wheel side surface and converting said laser beam into a corresponding image data; and
   processing means for processing said image data and calculating said wheel alignment, wherein said laser beam control means is an electromagnetic effect device for reducing the width of said laser beam by an electrical signal in such a manner that the laser beam from said laser light source means is radiated only in a predetermined range on the wheel side surface, wherein said electromagnetic effect device is an iris shutter.

21. An alignment measuring apparatus for measuring the alignment of a vehicle wheel in rotation in non-contact fashion, comprising:
   two laser light source means for emitting non-parallel laser beams having a section of a predetermined geometric pattern and forming a predetermined finite angle to each other toward different positions on at least the wheel side surface;
   a photodetecting device for receiving the two laser beams emitted from said two laser light sources and reflected on said wheel side surface and converting said laser beams into two corresponding image data; and processing means for calculating the distance between said two images based on said two image data and calculating said wheel alignment based on said distance.

22. An alignment measuring apparatus according to claim 21, comprising three detectors each including said two laser sources and said photodetecting device, wherein the two laser light sources of said first detector radiate two different vertical linear patterns at the top of said wheel side surface, and wherein the two laser light sources of each of said second and third detectors radiate two different horizontal patterns on the left and right sides of the cental portion of said wheel side surface.

23. An alignment measuring apparatus according to claim 21, wherein said photodetecting device includes a one-dimensional line photodetector for receiving the laser beams reflected in said predetermined range of said wheel side surface and converting said laser beams into corresponding image data.

24. An alignment measuring apparatus according to claim 21, wherein said photodetecting device includes a two-dimensional area photodetector for receiving the laser beams reflected in said predetermined range of said wheel side surface and converting said laser beams into corresponding image data.

25. An alignment measuring apparatus according to claim 21, further comprising laser beam control means for controlling the width of said laser beams in such a manner that the laser beams from said laser light sources are radiated only in a predetermined range of the wheel side surface.

26. An alignment measuring apparatus according to claim 1 or 21, further comprising a wheel center tracking mechanism for causing the center of said vehicle wheel to follow a reference position.

27. An alignment measuring apparatus according to claim 26, wherein said wheel center tracking mechanism is a mechanical tracking mechanism.

28. An alignment measuring apparatus according to claim 26, wherein said wheel center tracking mechanism is an electrical tracking mechanism having the correcting function by detecting the floating amount.

* * * * *